US012511902B2

(12) United States Patent
Shin et al.

(10) Patent No.: US 12,511,902 B2
(45) Date of Patent: Dec. 30, 2025

(54) METHOD AND DEVICE FOR PROVIDING RECIPE VIDEO

(71) Applicant: SAMSUNG ELECTRONICS CO., LTD., Suwon-si (KR)

(72) Inventors: Jaewook Shin, Suwon-si (KR); Haedong Yeo, Suwon-si (KR); Junho Rim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/813,620

(22) Filed: Aug. 23, 2024

(65) Prior Publication Data

US 2025/0069395 A1 Feb. 27, 2025

Related U.S. Application Data

(63) Continuation of application No. PCT/KR2024/010743, filed on Jul. 24, 2024.

(30) Foreign Application Priority Data

Aug. 23, 2023 (KR) .......................... 10-2023-0110767

(51) Int. Cl.
*G06F 40/20* (2020.01)
*G06V 10/25* (2022.01)
(Continued)

(52) U.S. Cl.
CPC .............. *G06V 20/46* (2022.01); *G06F 40/20* (2020.01); *G06V 10/25* (2022.01); *G06V 10/774* (2022.01);
(Continued)

(58) Field of Classification Search
CPC ...... G06F 40/20; G06V 10/25; G06V 10/774; G06V 10/82; G06V 20/41; G06V 20/46; G06V 20/49; G11B 27/031; G11B 27/00
(Continued)

(56) References Cited

U.S. PATENT DOCUMENTS

| 11,551,575 B1 | 1/2023 | Knighton et al. |
| 12,041,384 B2 | 7/2024 | Tak et al. |

(Continued)

FOREIGN PATENT DOCUMENTS

| JP | 6391078 B1 | 9/2018 |
| JP | 6465328 B1 | 2/2019 |

(Continued)

OTHER PUBLICATIONS

Alec Radford et al., "CLIP: Connecting text and images," OpenAI, Jan. 5, 2021, total 12 pages.

(Continued)

*Primary Examiner* — Daquan Zhao
(74) *Attorney, Agent, or Firm* — Sughrue Mion, PLLC

(57) ABSTRACT

A device and method for providing a recipe video are provided, the method including obtaining text feature information corresponding to each step of a cooking recipe, the cooking recipe comprising a plurality of steps corresponding to a plurality of coking actions; obtaining image feature information corresponding to each frame of a plurality of frames constituting a cooking video; matching each step of the cooking recipe with a respective section of the cooking video based on a correlation between the obtained text feature information and the obtained image feature information obtained using a machine learned matching model, wherein the respective section of the cooking video corresponds to a respective step among the plurality of steps; and generating the recipe video by using the respective section (Continued)

of the cooking video matched with each step of the cooking recipe.

20 Claims, 15 Drawing Sheets

(51) Int. Cl.
  *G06V 10/774* (2022.01)
  *G06V 20/40* (2022.01)
  *G11B 27/031* (2006.01)
(52) U.S. Cl.
  CPC .............. *G06V 20/41* (2022.01); *G06V 20/49* (2022.01); *G11B 27/031* (2013.01)
(58) Field of Classification Search
  USPC .................. 386/278, 282, 201, 239, 248
  See application file for complete search history.

(56) References Cited

U.S. PATENT DOCUMENTS

| 2016/0217329 | A1 | 7/2016 | Kang et al. | |
| 2021/0118447 | A1* | 4/2021 | Kim | G10L 15/22 |
| 2024/0404284 | A1* | 12/2024 | Hashimoto | G06N 3/08 |

FOREIGN PATENT DOCUMENTS

| JP | 2019-36886 A | 3/2019 |
| JP | 2019-201396 A | 11/2019 |
| JP | 2021-76876 A | 5/2021 |
| KR | 10-2019-0043830 A | 4/2019 |
| KR | 10-1968908 B1 | 4/2019 |
| KR | 10-2019-0100525 A | 8/2019 |
| KR | 10-2021-0046170 A | 4/2021 |
| KR | 10-2313279 B1 | 10/2021 |
| KR | 10-2023-0100531 A | 7/2023 |

OTHER PUBLICATIONS

Anonymous, "Recipe, A Schema.org Type," Schema.org, V27.02, Jul. 1, 2024, total 9 pages.
Anonymous, "CVPR 2022: TubeR: Tubelet Transformer for Video Action Detection," CEES Snoek Research on Video and Image AI, Jun. 13, 2022, total 3 pages.
Kemal Erdem (burnpiro), "Understanding Region of Interest—(RoI Aligh and RoI Warp)," Towards Data Science, Feb. 10, 2020, total 16 pages.
Anonymous, "Object Detection in the Wild via Grounded Language Image Pre-training," Microsoft, Project Florence-VL, Jun. 17, 2022, total 7 pages.
WonJun Moon et al., "Query-Dependent Video Representation for Moment Retrieval and Highlight Detection," arXiv:2303.13874v1 [cs.CV], Mar. 24, 2023, total 12 pages.
Jie Lei et al., "QVHIGHLIGHTS: Detecting Moments and Highlights in Videos via Natural Language Queries," 35th Conference on Neural Information Processing Systems (NeurIPS 2021), 2021, total 13 pages.
International Search Report (PCT/ISA/210) issued by the International Searching Authority on Oct. 24, 2024 in corresponding International Application No. PCT/KR2024/010743.

* cited by examiner

METHOD AND DEVICE FOR PROVIDING RECIPE VIDEO

CROSS-REFERENCES TO RELATED APPLICATIONS

This application is a continuation of International application No. PCT/KR2024/010743, filed on Jul. 24, 2024, at the Korean Intellectual Property Office, which claims priority from Korean Patent Application No. 10-2023-0110767, filed on Aug. 23, 2023, at the Korean Intellectual Property Office, the disclosures of which are incorporated herein by reference in their entireties.

FIELD

The disclosure relates to a method and device for providing a recipe video.

BACKGROUND

The Internet has evolved from a human-centered connection network, in which humans create and consume information, to an Internet of Things (IoT) network in which dispersed components such as objects exchange information with one another to process the information. Internet of Everything (IoE) technology has emerged, in which IoT technology is combined with big data processing technology through connections to cloud servers, etc. The IoT may be applied to fields such as smart appliances, smart homes, smart buildings, smart cities, etc., through convergence and integration between existing information technology (IT) and various industries.

In an IoT environment, each of the interconnected electronic devices may collect, generate, analyze, or process data, share the data with each other, and use the data for its own tasks. Recently, with rapid advances in the field of computer vision, various types of electronic devices that utilize neural network models to perform vision tasks have been developed. Furthermore, electronic devices equipped with generative artificial intelligence (AI) are capable of generating content requested by a user.

SUMMARY

According to an embodiment of the disclosure, a method of providing a recipe video is provided. The method includes obtaining text feature information corresponding to each step of a cooking recipe, the cooking recipe comprising a plurality of steps corresponding to a plurality of coking actions; obtaining image feature information corresponding to each frame of a plurality of frames constituting a cooking video; matching each step of the cooking recipe with a respective section of the cooking video based on a correlation between the obtained text feature information and the obtained image feature information obtained using a machine learned matching model, wherein the respective section of the cooking video corresponds to a respective step among the plurality of steps; and generating the recipe video by using the respective section of the cooking video matched with each step of the cooking recipe.

According to an embodiment of the disclosure, there is provided a non-transitory computer-readable medium storing instructions. The non-transitory computer-readable medium includes instructions that, when executed by at least one processor of a recipe video device, cause the at least one processor to: obtain text feature information corresponding to each step of a cooking recipe, the cooking recipe comprising a plurality of steps corresponding to a plurality of coking actions; obtain image feature information corresponding to each frame of a plurality of frames constituting a cooking video; match each step of the cooking recipe with a respective section of the cooking video based on a correlation between the obtained text feature information and the obtained image feature information obtained using a machine learned matching model, wherein the respective section of the cooking video corresponds to a respective step among the plurality of steps; and generate the recipe video by using the respective section of the cooking video matched with each step of the cooking recipe.

According to an embodiment of the disclosure, a device for providing a recipe video is provided. The device includes a memory storing one or more instructions and at least one processor. The processor is configured to execute the one or more instructions to obtain text feature information corresponding to each step of a cooking recipe. Furthermore, the processor is configured to execute the one or more instructions to obtain text feature information corresponding to each step of a cooking recipe, the cooking recipe comprising a plurality of steps corresponding to a plurality of coking actions; obtain image feature information corresponding to each frame of a plurality of frames constituting a cooking video; match each step of the cooking recipe with a respective section of the cooking video based on a correlation between the obtained text feature information and the obtained image feature information obtained using a machine learned matching model, wherein the respective section of the cooking video corresponds to a respective step among the plurality of steps; and generate the recipe video by using the respective section of the cooking video matched with each step of the cooking recipe.

BRIEF DESCRIPTION OF THE DRAWINGS

The above and other aspects, features, and advantages of certain embodiments of the present disclosure will be more apparent from the following description taken in conjunction with the accompanying drawings.

DETAILED DESCRIPTION

Figure 1:
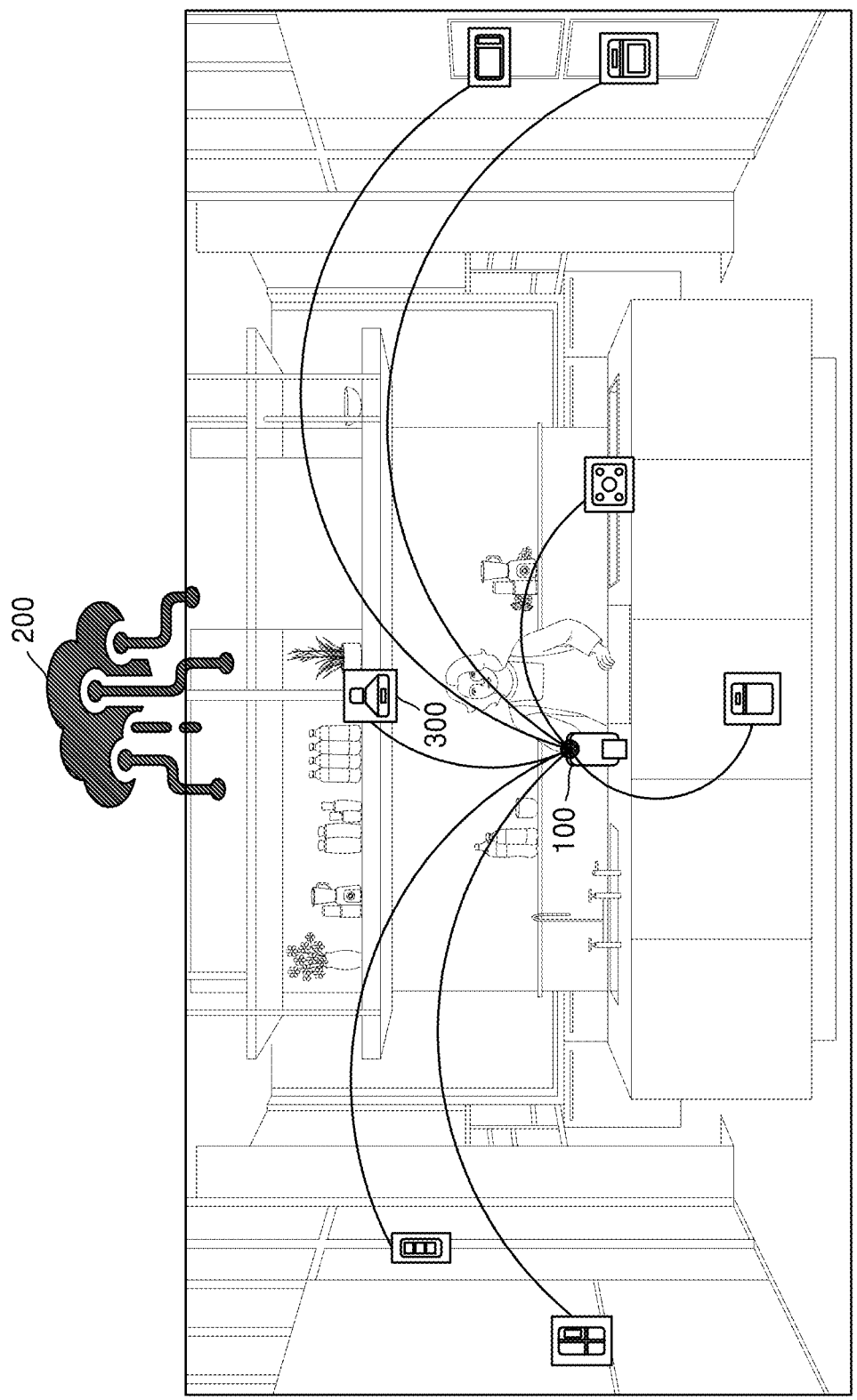
FIG. 1 is a diagram illustrating an Internet of Things (IoT) environment in which a user terminal, a server, and kitchen equipment are connected to one another, according to an embodiment of the disclosure.

Terms used in the present disclosure will now be briefly described and then the disclosure will be described in detail. Throughout the disclosure, the expression "at least one of a, b or c" indicates only a, only b, only c, both a and b, both a and c, both b and c, all of a, b, and c, or variations thereof.

The terms used herein are general terms currently widely used in related art based on functions described in the disclosure, but may be changed according to an intention of a person of ordinary skill in the art, precedent cases, advent of new technologies, etc. Furthermore, specific terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Singular expressions used herein are intended to include plural expressions as well unless the context clearly indicates otherwise. All the terms used herein, which include technical or scientific terms, may have the same meaning that is generally understood by a person of ordinary skill in the art. Furthermore, although the terms including an ordinal number such as "first", "second", etc. may be used herein to describe various elements or components, these elements or components should not be limited by the terms. The terms are only used to distinguish one element or component from another element or component.

Throughout the specification, when a part "includes" or "comprises" an element, unless there is a particular description contrary thereto, it is understood that the part may further include other elements, not excluding the other elements. In addition, terms such as "portion", "module", etc., described herein refer to a unit for processing at least one function or operation and may be implemented as hardware or software, or a combination of hardware and software.

Functions related to artificial intelligence (AI) according to the disclosure are performed via a processor and a memory. The processor may be configured as one or more processors. As an example, the one or more processors may be a general-purpose processor such as a central processing unit (CPU), an application processor (AP), a digital signal processor (DSP), etc., a dedicated graphics processor such as a graphics processing unit (GPU), a vision processing unit (VPU), etc., or a dedicated AI processor such as a neural processing unit (NPU). The one or more processors control input data to be processed according to predefined operation rules or AI model stored in the memory. In an embodiment, when the one or more processors are a dedicated AI processor, the dedicated AI processor may be designed with a hardware structure specialized for processing a particular AI model.

The predefined operation rules or AI model are created via a training process. The creation via the training process means that the predefined operation rules or AI model set to perform desired characteristics (or purposes) are created by training a AI model based on a large number of training data via a learning algorithm. The training process may be performed by an apparatus itself on which AI according to the disclosure is performed, or via a separate server and/or system. Examples of a learning algorithm may include, but are not limited to, supervised learning, unsupervised learning, semi-supervised learning, and reinforcement learning.

An AI model may consist of a plurality of neural network layers. Each of the plurality of neural network layers has a plurality of weight values and may perform neural network computations via calculations between a result of computations in a previous layer and the plurality of weight values. A plurality of weight values assigned to each of the plurality of neural network layers may be optimized by a result of training the AI model. For example, the plurality of weight values may be updated to reduce or minimize a loss or cost value obtained in the AI model during a training process. An artificial neural network may include a deep neural network (DNN), and may be, for example, a convolutional neural network (CNN), a DNN, a recurrent neural network (RNN), a restricted Boltzmann machine (RBM), a deep belief network (DBN), a bidirectional recurrent DNN (BRDNN), or deep Q-networks (DQNs) but is not limited thereto.

An embodiment of the disclosure will now be described more fully hereinafter with reference to the accompanying drawings so that the embodiment of the disclosure be easily implemented by one of ordinary skill in the art. However, the disclosure may be implemented in different forms and should not be construed as being limited to an embodiment of the disclosure set forth herein.

Hereinafter, the disclosure is described in detail with reference to the accompanying drawings.

FIG. 1 is a diagram illustrating an Internet of Things (IoT) environment in which a user terminal 100, a server 200, and kitchen equipment 300 are connected to one another.

In the disclosure, the user terminal 100 is described as a smartphone, but may be an image processing device such as various types of home assistant devices, mobile devices, augmented reality (AR) devices, and virtual reality (VR) devices operated for user convenience. The user terminal 100 may receive an input from a user and performs an operation corresponding to the received input by using at least one of models such as a DNN, a CNN, an RNN, and a BRDNN.

The user terminal 100 may be connected to the server 200 that provides certain services and the various types of equipment, e.g., kitchen equipment 300 via communication. For example, the user terminal 100 may receive, from the kitchen equipment 300, information related to the kitchen equipment 300 or a video captured by the kitchen equipment 300. To this end, the user terminal 100 may have an application installed that allows the user to use an integrated management platform that connects and controls IoT products among the pieces of kitchen equipment 300. The user terminal 100 may register IoT devices among the pieces of kitchen equipment 300 and control the registered IoT devices. The user terminal 100 may receive information obtained by scanning the kitchen, information of objects in the kitchen, and videos captured of events occurring in the kitchen from the registered IoT devices, and store and manage the received information and videos. The user terminal 100 may transmit, to the server 200, information related to the pieces of kitchen equipment 300 or videos received from the pieces of kitchen equipment 300.

The server 200 may store and manage information obtained by scanning the kitchen, information of objects in the kitchen, and videos captured of events occurring in the kitchen, which are all received from the user terminal 100 or the pieces of kitchen equipment 300. The server 200 may provide predetermined services based on the information or videos received from the user terminal 100 or the pieces of kitchen equipment 300, or support a predetermined services provided by the user terminal 100. The server 200 may use at least one AI model to provide the predetermined services based on the information or videos received from the user terminal 100.

The pieces of kitchen equipment 300 may include kitchen appliances, kitchen furniture, tableware, and cooking utensils. The kitchen appliances include cooking devices such as a gas range, an induction range, a cooktop, an air fryer, an oven, a microwave oven, a blender, a toaster, etc. The kitchen appliances include storage devices such as a refrigerator, a freezer, etc. The kitchen appliances include ventilation devices such as a hood. The kitchen appliances include cleaning devices such as a dishwasher. The kitchen furniture may include a countertop, a sink, a pantry, a dining table, etc. The tableware and cooking utensils may include bowls, pots, frying pans, cutting boards, etc. The pieces of kitchen equipment 300 are not limited to the above-described examples of kitchen appliances, kitchen furniture, tableware, and cooking utensils. In the disclosure, the kitchen refers to a space where cooking is done. The kitchen does not need to be a specialized space set up for the purpose of cooking or a physically separate space as long as it is a space for cooking.

As shown in FIG. 1, in an IoT environment where the user terminal 100, the server 200, and the pieces kitchen equipment 300 in the kitchen are connected to one another, new forms of content that may meet user's needs may be created by using information or videos shared among the interconnected devices. When the user performs cooking in the kitchen, various pieces of kitchen equipment 300 may be used. The kitchen equipment 300 equipped with a camera may capture a video of the user's cooking actions or cooking process at a corresponding location, and may capture a video of an operation of the kitchen equipment 300 used for cooking. Hereinafter, a method of generating a recipe video consisting of video clips corresponding to steps in a cooking recipe, by using the videos captured in this way, is described.

Figure 2:
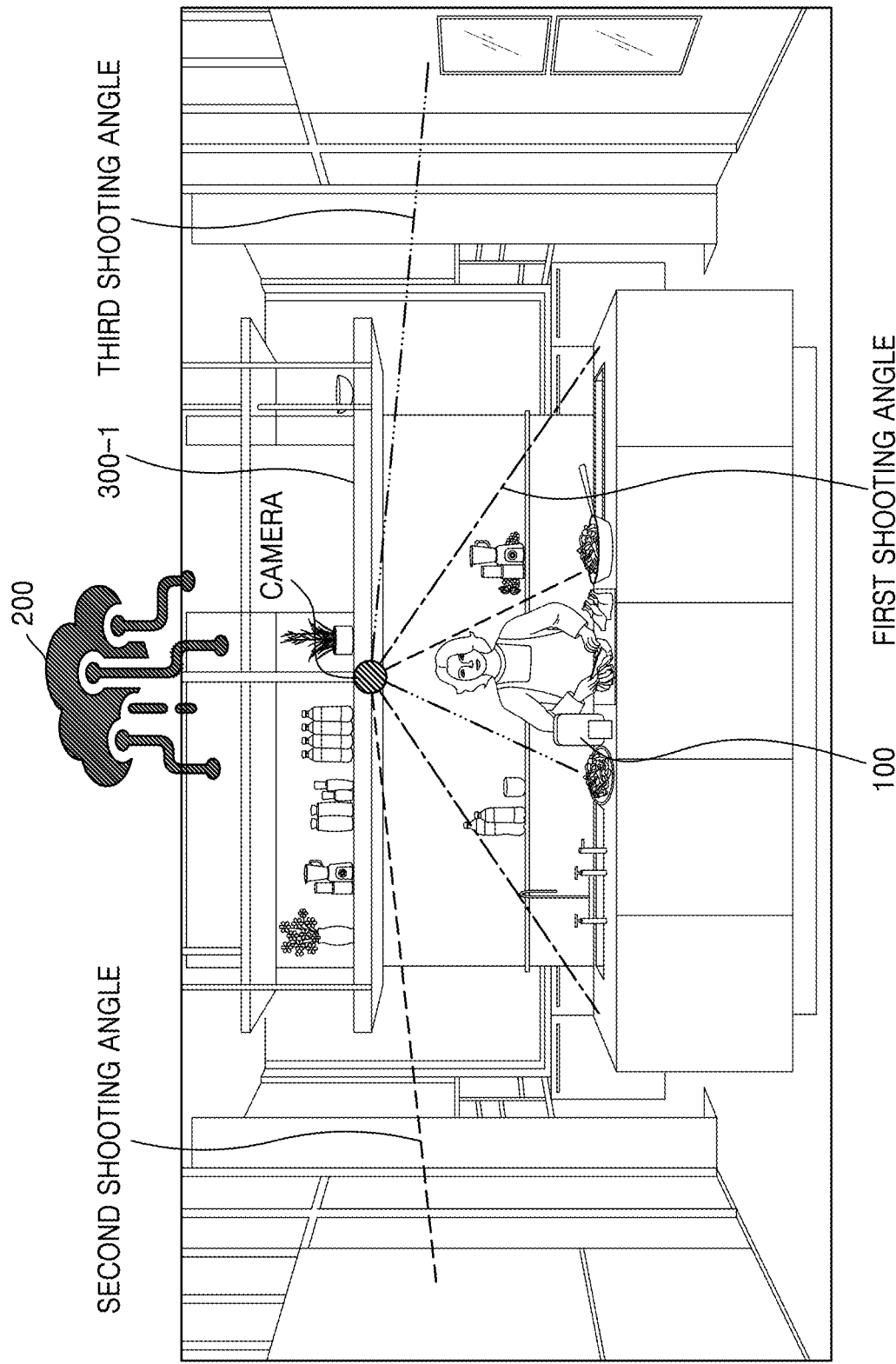
FIG. 2 is a diagram illustrating a process in which a device for providing a recipe video obtains a cooking video, according to an embodiment of the disclosure.

FIG. 2 is a diagram illustrating a process in which a device for providing a recipe video (hereinafter referred to as a 'recipe video providing device') obtains a cooking video, according to an embodiment of the disclosure.

The recipe video providing device is a device that generates the recipe video, and may be the user terminal 100 or the server 200. When the user terminal 100 is the recipe video providing device, the user terminal 100 may generate a recipe video by using images captured using a camera provided in the user terminal 100 or images received from the kitchen equipment 300 connected to the user terminal 100. When the server 200 is the recipe video providing device, the server 200 may generate a recipe video by obtaining, via the user terminal 100, images captured using a camera installed on the kitchen equipment 300.

Referring to FIG. 2, a camera is installed on the kitchen equipment 300 with a hood 300-1 installed. The camera may be installed in the center of the kitchen equipment 300 with the hood 300-1 installed, but is not limited thereto. The camera mounted on the kitchen equipment 300 with the hood 300-1 installed may be used to capture the user cooking at a countertop. Referring to FIG. 2, the countertop may include a sink for washing food ingredients, a top surface for preparing food ingredients, and a cooktop installed in a built-in form.

The camera mounted on the kitchen equipment 300 with the hood 300-1 installed may capture a space corresponding to a specific shooting angle according to a function of adjusting an angle of view or changing a shooting direction. As shown in FIG. 2, the camera may capture the entire countertop from a first shooting angle, capture the sink and a portion of the top surface of the countertop and a refrigerator side from a second shooting angle, and capture the cooktop and a portion of the top surface of the countertop and an oven side from a third shooting angle. The camera installed on the kitchen equipment 300 may track a user's cooking action or a cooking utensil in real time and change a shooting angle to capture an image of the user cooking. For dishes cooked using various pieces of kitchen equipment 300, when only a specific location is captured from a specific shooting angle, only a portion of the entire cooking process is emphasized, so a recipe video for the entire cooking process may not be generated. Thus, in order to generate the recipe video for the entire cooking process, at least one camera capable of capturing a plurality of locations may be used to capture multiple locations where the cooking takes place. The camera installed on the kitchen equipment 300 may change its focal length to capture close-up images of cooking actions, cooking utensils, or cooking process via a zoom or telephoto function. As shown in FIG. 2, the recipe video providing device may obtain a video (hereinafter, a cooking video) captured of cooking actions or cooking process for making food from the kitchen equipment 300 having the camera installed.

Figure 3:
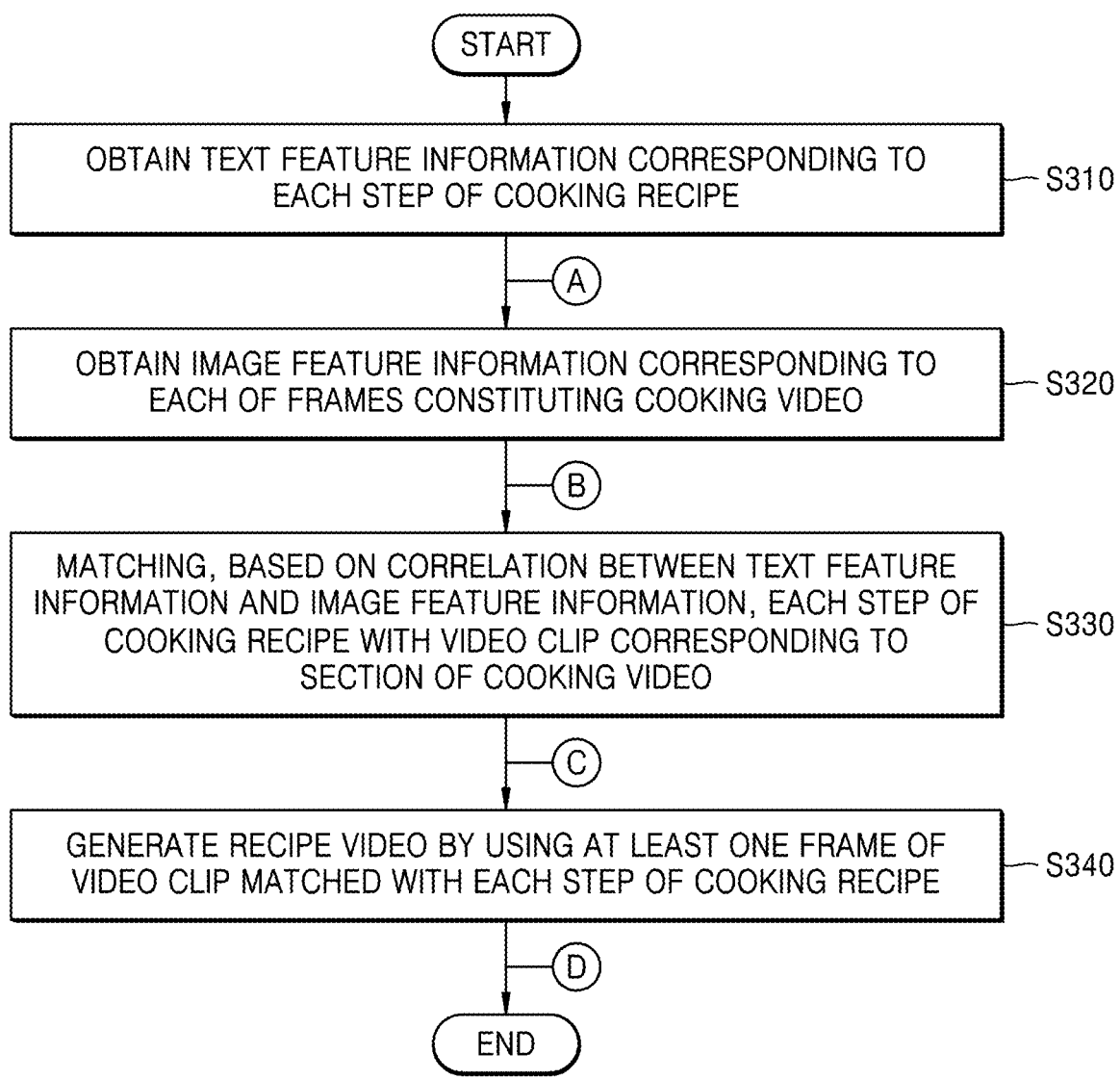
FIG. 3 is a flowchart of a method of providing a recipe video, according to an embodiment of the disclosure.

FIG. 3 is a flowchart of a method of providing a recipe video, according to an embodiment of the disclosure.

Referring to FIG. 3, in operation S310, a recipe video providing device obtains text feature information corresponding to each step of a cooking recipe. The cooking recipe includes a plurality of steps for making food from ingredients. Each step corresponds to a cooking action for making food, and the user may make food by performing cooking according to an order of the steps.

The recipe video providing device may obtain information about the cooking recipe in various ways. For example, the recipe video providing device may obtain information about the cooking recipe based on a user input. When the user knows the cooking recipe, the user may directly input information about the cooking recipe to the recipe video providing device. For example, the recipe video providing device may obtain information about the cooking recipe from a database of cooking recipes. The recipe video providing device may obtain information about the cooking recipe by retrieving an appropriate cooking recipe from a database based on information about the type of food ingredients or cooking method according to a user input. For example, the recipe video providing device may obtain information about the cooking recipe from an external device. When there is an already published or famous cooking recipe, the recipe video providing device may request the cooking recipe from an external device that has information about the cooking recipe, and receive information about the cooking recipe in response.

The recipe video providing device extracts a text corresponding to each step of the cooking recipe and obtains text feature information from the text corresponding to each step. For example, the recipe video providing device may represent a sentence corresponding to a step as a vector. The recipe video providing device may position the vector corresponding to the sentence in a vector space. The recipe video providing device may perform text feature embedding on a sentence corresponding to each step of the cooking recipe. Embedding for a sentence may be performed by pooling embeddings for words that constitute the sentence, but is not limited thereto.

In operation S320, the recipe video providing device obtains image feature information corresponding to each of the frames constituting a cooking video. The cooking video is a video captured of cooking actions for making food. The cooking video consists of a plurality of frames. The cooking video may include a plurality of video clips. A video clip is a portion of the cooking video and refers to a section of a video consisting of frames between a specific cut and another specific cut.

The recipe video providing device may obtain a cooking video in various ways. For example, the recipe video providing device may obtain a cooking video from the kitchen equipment 300 having a camera installed thereon. The recipe video providing device may register the pieces of kitchen equipment 300 that capture cooking videos via a predetermined application, and control the registered pieces of kitchen equipment 300 to receive the cooking videos. The recipe video providing device may obtain a cooking video from an external device. When the recipe video providing device is the user terminal 100, the user terminal 100 may receive cooking videos from at least one piece of kitchen equipment 300 interconnected thereto. When the recipe video providing device is the server 200, the server 200 may receive cooking videos collected by the user terminal 100.

The recipe video providing device may extract each of the frames that constitute the cooking video and obtain image feature information from an image of each frame. Image feature information may be obtained for each frame that constitutes the cooking video. For example, the recipe video providing device may represent a frame of an image as a vector. The recipe video providing device may position the vector corresponding to the frame of the image in a vector space. The recipe video providing device may perform image feature embedding on an image of each frame in the cooking video. Embedding for the image of each frame may be performed by embedding key features within the image or by pooling embeddings for objects or subregions within the image.

According to an embodiment of the disclosure, the recipe video proving device may obtain image feature information corresponding to specific section and a specific region in the cooking video. The image feature information extracted from the specific section and the specific region in the cooking video represents features of a specific object or a specific movement within the image corresponding to the frame, enabling accurate image classification or matching by focusing on a target of user's interest. Hereinafter, an embodiment in which image feature information corresponding to a specific section and a specific region is obtained based on a target of interest is described with reference to FIGS. 4 and 5.

Figure 4:
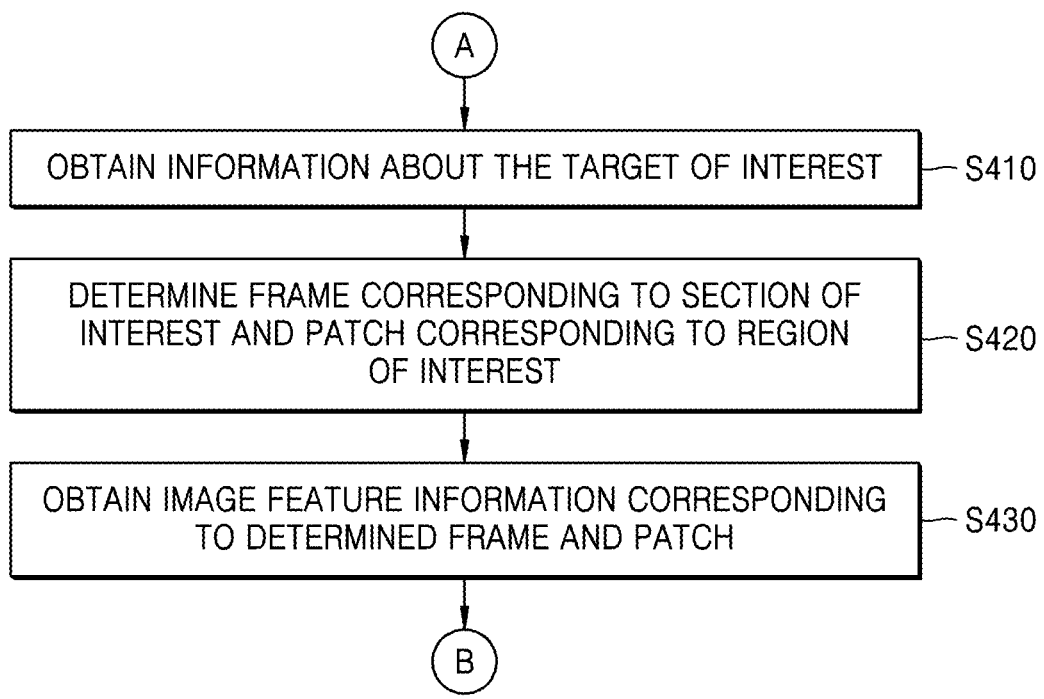
FIG. 4 is a flowchart of a method of providing a recipe video, according to an embodiment of the disclosure.

FIG. 4 is a detailed flowchart illustrating an operation of obtaining image feature information corresponding to each of the frames constituting a cooking video based on information about a target of interest, according to an embodiment of the disclosure.

In operation S410, the recipe video providing device may obtain information about a target of interest. The information about the target of interest may be information about at least one of a section of interest or a region of interest. The information about the target of interest may be information about a section of interest, information about a region of interest, or information about both a section of interest and a region of interest. A target of interest in a video may correspond to at least one of a temporal sequence in the video or a spatial location in the video. The information about the target of interest in the video may be information about a time point at which (or which frame of the video) the video is played after the start of the video, and may be information about to which part of the displayed video the target of interest corresponds. In addition, the information about the target of interest in the video may be information about to which frame of the video and which portion of the frame the target of interest in the video corresponds. The information about the target of interest may be guide information indicating which section of the entire video is important and which region of a captured video is important.

In an embodiment of the disclosure, the information about the target of interest may include information about a section of interest based on an operational situation of the kitchen equipment 300 and information about a region of interest based on a location of the kitchen equipment 300. The information about the target of interest may indicate a time point and a period when the kitchen equipment 300 was used for cooking in a cooking video, as well as a location of the kitchen equipment 300 in the cooking video. For example, when the kitchen includes an induction range, the information about the target of interest may be information about at which time point a heating zone was operated after the start of cooking and which heating zone was operated and a location of the operated heating zone among heating zones. By using this information, feature information may be extracted from a predetermined region including a heating zone used for cooking in a video clip corresponding to a portion of a cooking video in which the induction range is used.

In an embodiment of the disclosure, the information about the target of interest may include information about a section of interest and a region of interest based on tracking of cooking actions. The information about the target of interest may be used to focus on dynamic spatio-temporal characteristics of a cooking action for making food in the cooking video by identifying a location where the cooking action is taking place and recognizing the cooking action in the cooking video. For example, when the cooking video shows a chef making food, a spatial location where the chef cooks in the kitchen may be identified, and the chef's movement may be recognized as a cooking action such as chopping food ingredients or stir-frying food ingredients in a frying pan. Feature information may be extracted from a portion of the cooking video where the cooking action is taking place.

In an embodiment of the disclosure, the information about the target of interest may include information about a section of interest and a region of interest based on tracking of the kitchen equipment 300. The information about the target of interest may be used to focus on dynamic spatio-temporal characteristics of the kitchen equipment 300 in the cooking video by identifying a location of the kitchen equipment 300 and recognizing the kitchen equipment 300 in the cooking video. For example, when a specific cooking utensil is used in the cooking video, a spatial location of the specific cooking utensil in the kitchen may be identified and the cooking utensil may be recognized. Feature information may be extracted from a predetermined region including the cooking utensil used for cooking in the cooking video.

In an embodiment of the disclosure, the information about the target of interest may include information about a section of interest and a region of interest based on tracking of a cooking action and the kitchen equipment 300. For example, when the chef uses a specific cooking utensil, locations of the chef and the specific cooking utensil may be identified in the cooking video, and the chef's cooking action and the specific cooking utensil may be recognized. Feature information may be extracted from the chef's cooking action, the specific cooking utensil, and a predetermined region in which the chef performs the cooking action by using the specific cooking utensil.

In an embodiment of the disclosure, information about a section of interest and information about a region of interest corresponding to the information about the target of interest may be determined independently or dependently. With the information about the region of interest being determined first, the information about the section of interest may be determined independently. For example, in a state in which a region of interest based on the location of the kitchen equipment 300 is determined first in each of the frames constituting the cooking video, when information about a section of interest based on an actual operational situation of the kitchen equipment 300 is determined, a region of interest may be effectively set only for frames in the specific section. The information about the region of interest and the information about the section of interest may be determined dependently. For example, when a section of interest and a region of interest are determined based on tracking of a predetermined action or object, a region (or a bounding box) in which the predetermined action or object has been tracked may be set for consecutive sections in adjacent frames by using a target of interest extraction model trained for action classification and action range (or object classification and object range) in various situations. The target of interest extraction model may be trained to detect and track cooking actions or the kitchen equipment 300 by using a training dataset related to the cooking video.

In operation S420, the recipe video providing device may determine, among frames constituting a cooking video, frames corresponding to a section of interest and patches corresponding to regions of interest according to the information about the target of interest. For example, the recipe video providing device may determine frames corresponding to a section of interest based on the operational situation of the kitchen equipment 300 and patches corresponding to regions of interest based on the location of the kitchen equipment 300. The recipe video providing device may determine, based on tracking of a cooking action, frames corresponding to a section of interest and patches corresponding to regions of interest. The recipe video providing device may determine, based on tracking of the kitchen equipment 300, frames corresponding to a section of interest and patches corresponding to regions of interest. The recipe video providing device may determine, based on tracking of both a cooking action and the kitchen equipment 300, frames corresponding to a section of interest and patches corresponding to regions of interest.

Figure 5:
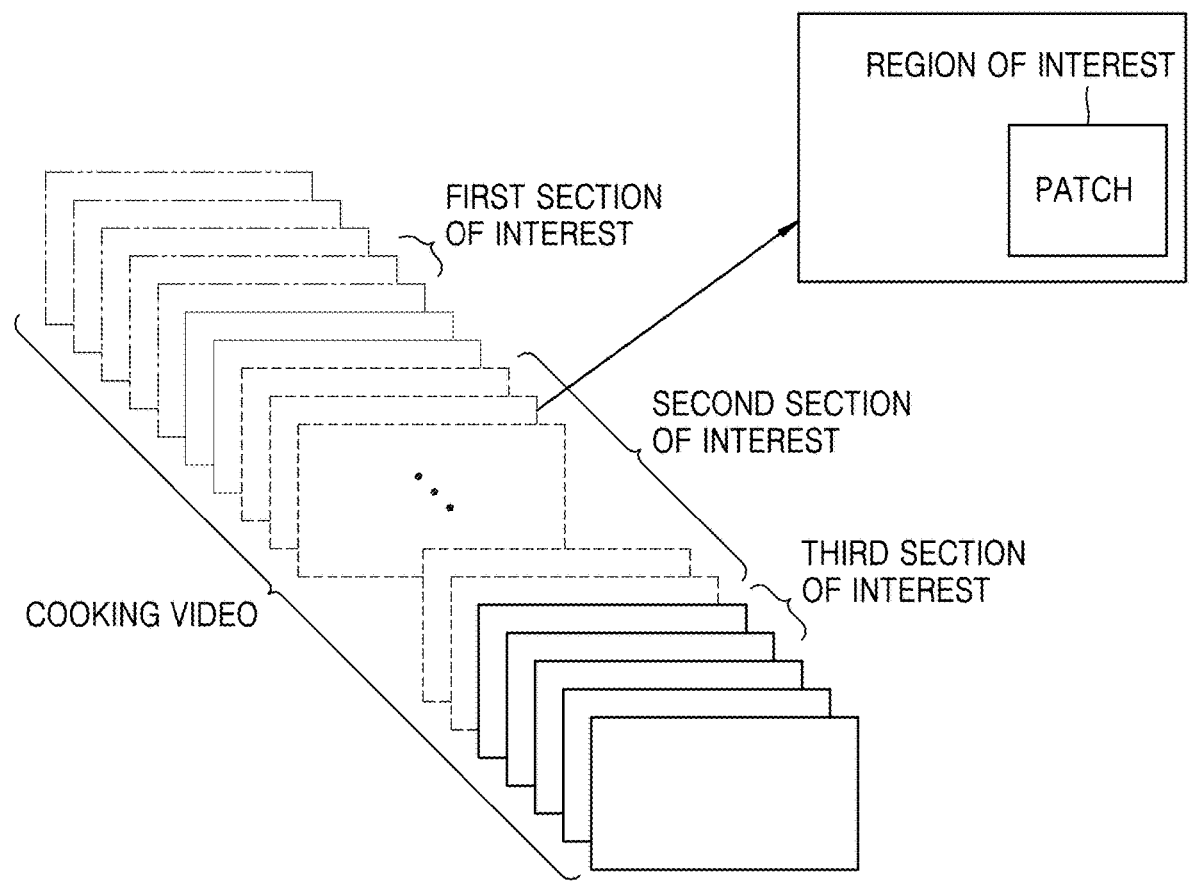
FIG. 5 is a diagram illustrating frames corresponding to a section of interest and a patch corresponding to a region of interest, according to an embodiment of the disclosure.

FIG. 5 is a diagram illustrating frames corresponding to a section of interest and a patch corresponding to a region of interest, according to an embodiment of the disclosure.

A cooking video may be composed of a plurality of frames. The cooking video shown in FIG. 5 may be a video captured of the entire process of making food. In FIG. 5, the number of frames is illustrated in a simplified manner for convenience of description, but the number of frames in the cooking video may be determined according to a frame rate and a total playback time of the cooking video. Frames between a specific frame and another frame may be a video clip. FIG. 5 illustrates frames corresponding to a section of interest and a patch corresponding to a region of interest, which are determined according to information about a target of interest among all the frames constituting the cooking video.

The cooking video shown in FIG. 5 may be a sequence of a first process of preparing dishes and cooking utensils, a second process of preparing and prepping food ingredients, a third process of disposing of food waste discarded during the process of preparing food ingredients, a fourth process of cooking food, and a fifth process of plating the food onto a dish, which are all captured in chronological order. For example, sections of the cooking video to be included in a recipe video may include the cooking process, a part of the cooking preparation process before and after the cooking process, and a part of the plating process. Among the first to fifth processes included in the cooking video, a part of the second process, the fourth process, and a part of the fifth process may correspond to sections of interest. Referring to FIG. 5, frames corresponding to a first section of interest in the cooking video may correspond to the part of the second process, frames corresponding to a second section of interest may correspond to the fourth process, and frames corresponding to a third section of interest may correspond to the part of the fifth process.

For each of the frames corresponding to a section of interest, a patch corresponding to a region of interest may be determined. Referring to FIG. 5, a patch corresponding to a region of interest may be determined for each of the frames corresponding to the first section of interest, the frames corresponding to the second section of interest, and the frames corresponding to the third section of interest in the cooking video.

According to an embodiment of the disclosure, the information about the target of interest may include information about a section of interest based on an operational situation of the kitchen equipment 300 and information about a region of interest based on a location of the kitchen equipment 300. For example, when most of the cooking process involves stir-frying ingredients on an induction range, the information about the target of interest may include information about a section of interest based on a period during which a heating zone of the induction range was operated and information about a region of interest based on a location of the ignited heating zone among heating zones of the induction range in the video. Referring to FIG. 5, frames corresponding to the second section of interest based on the period during which the heating zone of the induction range was operated may be determined. In each of the frames corresponding to the second section of interest, a patch corresponding to a region of interest based on a location of the ignited heating zone of the induction range may be determined.

According to an embodiment of the disclosure, the information about the target of interest may include information about a section of interest and a region of interest based on tracking of a cooking action and the kitchen equipment 300. For example, when a chef prepares food ingredients by using a first cooking utensil, cooks the food by using a second cooking utensil, and plates the finished food on tableware, the information about the target of interest may include information about a section of interest and a region of interest based on the action of preparing the food ingredients by using the first cooking utensil, the cooking action using the second cooking utensil, and the plating action using the tableware. Referring to FIG. 5, frames corresponding to the first section of interest and patches corresponding to regions of interest may be determined based on the action of preparing the food ingredients by using the first cooking utensil. Frames corresponding to the second section of interest and patches corresponding to regions of interest may be determined based on the cooking action using the second cooking utensil. Frames corresponding to the third section of interest and patches corresponding to regions of interest may be determined based on the plating action using the tableware.

Referring back to FIG. 4, in operation S430, the recipe video providing device may obtain image feature information corresponding to the frames and the patches determined according to the information about the target of interest from the cooking video. The recipe video providing device may obtain image feature information of all frames included in the cooking video, but when there is information about a target of interest, may obtain image feature information corresponding to some of the frames and patches.

By using the information about the target of interest, the recipe video providing device may extract image feature information from a predetermined region of a video clip corresponding to a section of the entire video. For example, when the information about the target of interest is information about a section corresponding to a cooking process and a location of the kitchen equipment 300 used in the cooking process, image feature information may be extracted from a certain region including a location of the corresponding kitchen equipment 300 in each of some frames corresponding to the cooking process among the frames constituting the cooking video. A portion of the cooking video other than a section of interest may be a video clip corresponding to a section where the kitchen equipment 300 or people cooking are not captured, and a non-region of interest may be a portion where a space unrelated to cooking, such as a floor or wall, is captured.

When image feature information is extracted from an image by using the information about the target of interest, the accuracy of classifying or matching images by using the image feature information may be increased. When image feature information for a specific section and a specific region is extracted using information about a target of interest in a video in which a plurality of objects or a plurality of movements are detected, the extracted image feature information may be used to classify or match images by focusing on a specific object or a specific movement. For example, when a captured cooking video is of several dishes being simultaneously cooked, image feature information for a section and a region corresponding to cooking of one specific dish may be extracted using information about a target of interest related to the specific dish. The image feature information extracted using the information about the target of interest in this way may be used to increase the accuracy of classifying or matching images for the specific dish.

When information about a target of interest related to each of a plurality of dishes is used, image feature information for a section corresponding to cooking of each dish and a region related to each dish may be extracted. When a plurality of dishes simultaneously being cooked are captured together within frames constituting a cooking video, image feature information of each of the plurality of dishes may be extracted using information about a target of interest related to each dish. By using image feature information of each of the plurality of dishes extracted using information about the target of interest related to each dish, a recipe video may be generated based on a cooking recipe of the corresponding dish.

In the following description, depending on whether information about a target of interest is used to generate a recipe video, image feature information may refer to pieces of image feature information respectively corresponding to all frames included in the cooking video, or pieces of image feature information corresponding to some frames and patches determined according to the information about the target of interest.

Referring back to FIG. 3, in operation S330, the recipe video providing device may match, based on a correlation between the obtained text feature information and the obtained image feature information, each step of the cooking recipe with a video clip corresponding to a section of the cooking video. The recipe video providing device may match each step of the cooking recipe with a video clip corresponding to a section of the cooking video by using a matching model that takes the obtained text feature information and the obtained image feature information as inputs and outputs a correlation between the obtained image feature information and the obtained text feature information. The matching model may be trained based on a dataset including text feature information and image feature information. The matching model may calculate a correlation between the obtained text feature information and the obtained image feature information through a matrix multiplication between the obtained text feature information and the obtained image feature information. Hereinafter, matching between each step of a cooking recipe and a video clip corresponding to a section of a cooking video is described in detail with reference to FIGS. 6 through 8.

Figure 6:
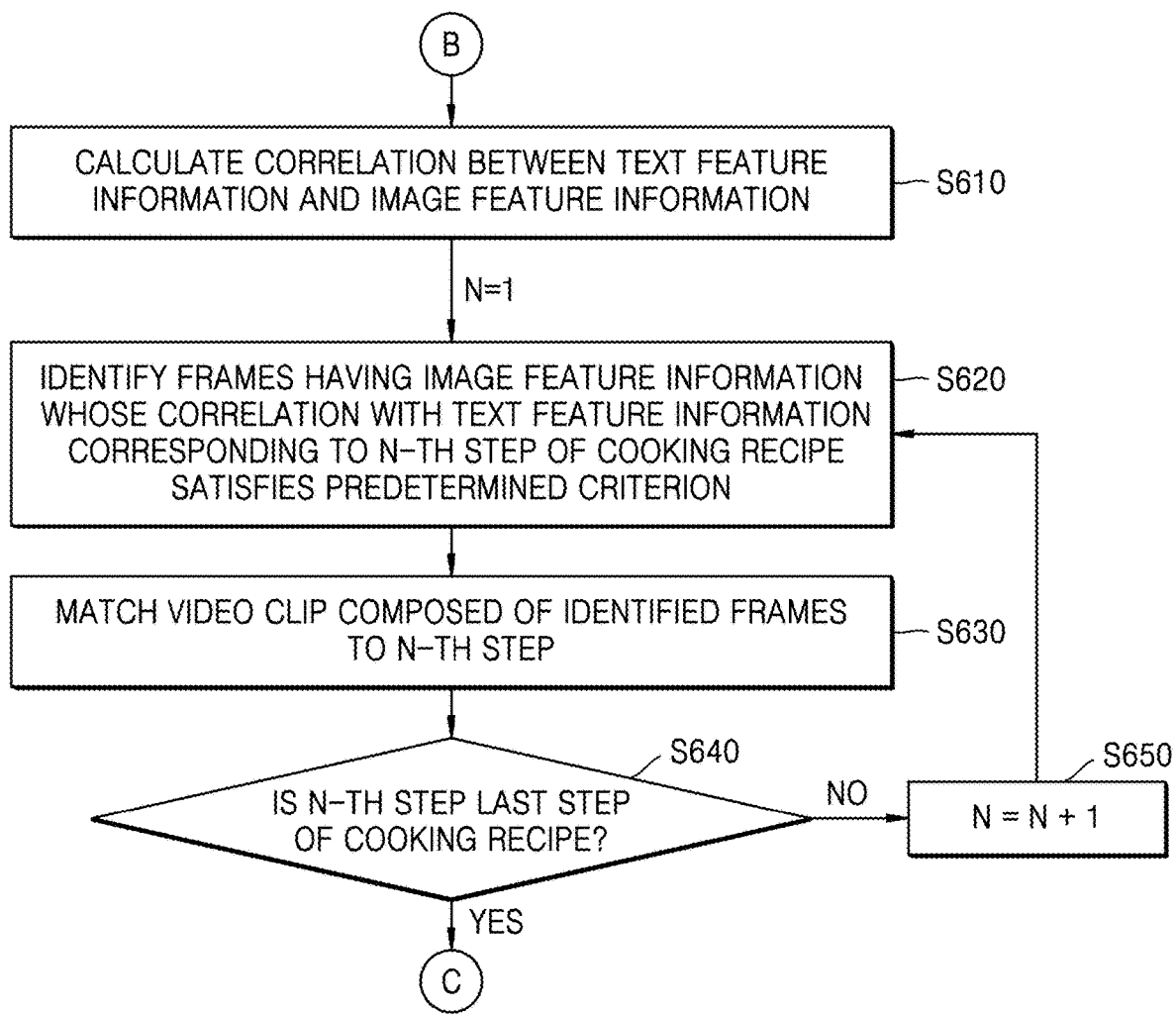
FIG. 6 is a flowchart of a method of providing a recipe video, according to an embodiment of the disclosure.

FIG. 6 is a detailed flowchart illustrating an operation of matching each step of a cooking recipe with a video clip corresponding to a section of a cooking video, according to an embodiment of the disclosure.

In operation S610, the recipe video providing device may calculate a correlation between the text feature information and the image feature information. A matching model trained based on a dataset including text feature information and image feature information may output similarity of text feature information corresponding to each step of the cooking recipe with image feature information extracted from the cooking video as a correlation. The matching model may include a network of layers that calculate similarities between pieces of feature information from data of different modalities.

In operation S620, the recipe video providing device may identify frames having image feature information whose correlation with text feature information corresponding to an N-th step of the cooking recipe (hereinafter, the N-th text feature information) satisfies a predetermined criterion. The recipe video providing device may, according to the order of each step of the cooking recipe, identify frames having image feature information whose correlation is greater than or equal to a predetermined value, starting from text feature information corresponding to a first step (hereinafter, the first text feature information).

In operation S630, the recipe video providing device may match a video clip composed of the identified frames to the N-th step. The recipe video providing device may process the frames having image feature information whose correlation with the N-th text feature information is greater than or equal to the predetermined value as a video clip (hereinafter, the N-th video clip). The recipe video providing device may match the N-th video clip to the N-th step corresponding to the N-th text feature information.

In operation S640, the recipe video providing device may check whether the N-th step is a last step of the cooking recipe. When the N-th step is the last step of the cooking recipe, the recipe video providing device may end matching each step of the cooking recipe with a video clip corresponding to a section of the cooking video.

In operation S650, when the N-th step is not the last step of the cooking recipe, the recipe video providing device may repeat operations S620 and S630 for matching a video clip to a next step (an N+1-th step).

Figure 7:
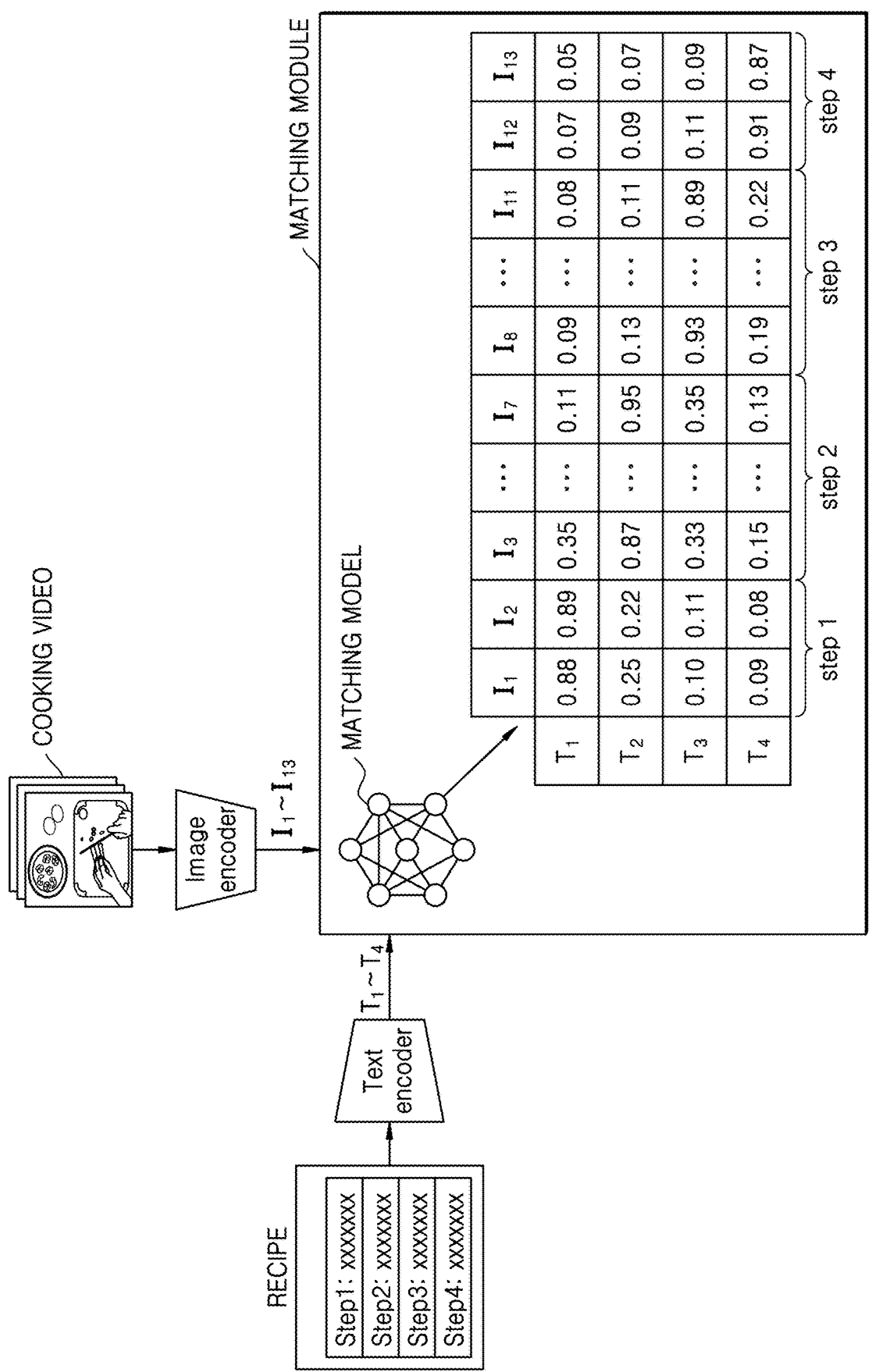
FIG. 7 is a diagram illustrating a process of matching each step in a cooking recipe with a video clip corresponding to a section of a cooking video by using a matching model, according to an embodiment of the disclosure.

FIG. 7 is a diagram illustrating a process of matching each step of a cooking recipe with a video clip corresponding to a section of a cooking video by using a matching model, according to an embodiment of the disclosure.

Referring to FIG. 7, the cooking recipe may include a first step, a second step, a third step, and a fourth step. The recipe video providing device may respectively obtain, via a text encoder, first text feature information $T_1$, second text feature information $T_2$, third text feature information $T_3$, and fourth text feature information $T_4$, from texts (or sentences) associated with steps of the cooking recipe. A cooking video may include a plurality of frames. In FIG. 7, for convenience of description, the number of frames constituting the cooking video or the number of frames according to information about a target of interest is reduced to 13 frames, i.e., first to thirteenth frames, but is not limited thereto. The recipe video providing device may respectively obtain, via an image encoder, first image feature information $I_1$ to thirteenth image feature information $I_{13}$ from the frames.

Referring to FIG. 7, a matching model included in a matching module includes a network of layers that calculate a similarity between matching text feature information and image feature information, and may output the calculated similarity as a correlation between the text feature information and the image feature information.

The recipe video providing device may identify, via the matching module, a first frame and a second frame respectively corresponding to the first image feature information $I_1$ and the second image feature information $I_2$ whose correlation with the first text feature information $T_1$ satisfies a predetermined criterion (e.g., when the correlation has a value greater than a predetermined threshold of 0.85). The recipe video providing device may match a first video clip including the first frame and the second frame with the first step corresponding to the first text feature information $T_1$.

The recipe video providing device may identify, via the matching module, third to seventh frames respectively corresponding to the third image feature information $I_3$ to the seventh image feature information $I_7$ whose correlation with the second text feature information $T_2$ satisfies a predetermined criterion. The recipe video providing device may match a second video clip including the third to seventh frames to the second step corresponding to the second text feature information $T_2$.

The recipe video providing device may identify, via the matching module, eighth to eleventh frames respectively corresponding to the eighth image feature information $I_8$ to the eleventh image feature information $I_{11}$ whose correlation with the third text feature information $T_3$ satisfies a predetermined criterion. The recipe video providing device may match a third video clip including the eighth to eleventh frames to the third step corresponding to the third text feature information $T_3$.

The recipe video providing device may identify, via the matching module, a twelfth frame and a thirteenth frame respectively corresponding to the twelfth image feature information $I_{12}$ and the thirteenth image feature information $I_{13}$ whose correlation with the fourth text feature information $T_4$ satisfies a predetermined criterion. The recipe video providing device may match a fourth video clip including the twelfth frame and the thirteenth frame with the fourth step corresponding to the fourth text feature information $T_4$.

In this way, the recipe video providing device may match, via the matching module, a video clip composed of frames having image feature information whose correlation satisfies a predetermined criterion to a corresponding step of the cooking recipe. The recipe video providing device may perform the task of matching video clips up to the last step of the cooking recipe via the matching module.

Figure 8:
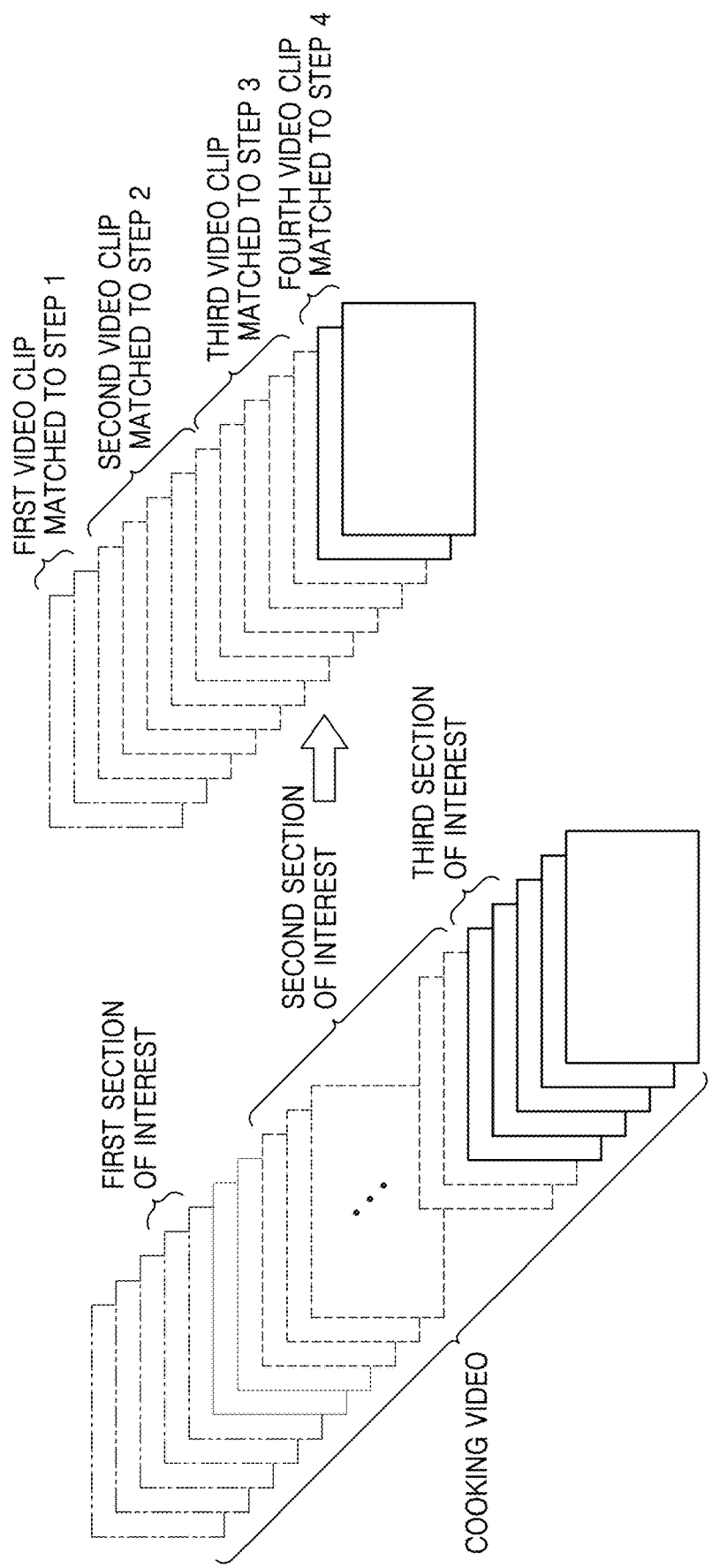
FIG. 8 is a diagram illustrating a video clip matched to each step in a cooking recipe, according to an embodiment of the disclosure.

FIG. 8 is a diagram illustrating a video clip matched to each step of a cooking recipe, according to an embodiment of the disclosure.

FIG. 8 shows a video clip matched to each step of a cooking recipe, where, as an example, the recipe video providing device obtains image feature information according to information about a target of interest.

The recipe video providing device may determine patches corresponding to regions of interest respectively in frames corresponding to a first section of interest, frames corresponding to a second section of interest, and frames corresponding to a third section of interest in the cooking video, and obtain image feature information of the patches. Referring to FIG. 8 in conjunction with the example previously described with reference to FIG. 7, it may be seen that the first section of interest corresponding to a food ingredient preparation process includes the first frame and the second frame, the second section of interest corresponding to a cooking process includes the third to eleventh frames, and the third section of interest corresponding to a plating process includes the twelfth and thirteenth frames. As described with reference to FIG. 7, the cooking recipe consists of a total of four steps, and is described as a fried rice recipe.

When the first step of the cooking recipe involves preparing food ingredients, the recipe video providing device may process the first frame and the second frame respectively corresponding to the first image feature information $I_1$ and the second image feature information $I_2$, whose correlation with the first text feature information $T_1$ satisfies a predetermined criterion, as the first video clip matched to the first step. When the second step of the cooking recipe involves a cooking process of stir-frying the prepared food ingredients, the recipe video providing device may process the third frame to the seventh frame respectively corresponding to the third image feature information Is to the seventh image feature information $I_7$, whose correlation with the second text feature information $T_2$ satisfies a predetermined criterion, as the second video clip matched to the second step. When the third step of the cooking recipe involves a cooking process of adding more rice to the stir-fried food ingredients, frying them, and seasoning them, the recipe video providing device may process the eighth frame to the eleventh frame respectively corresponding to the eighth image feature information $I_8$ to the eleventh image feature information $I_{11}$, whose correlation with the third text feature information $T_3$ satisfies a predetermined criterion, as the third video clip matched to the third step. When the fourth step of the cooking recipe involves plating the cooked fried rice on tableware, the recipe video providing device may process the twelfth frame and the thirteenth frame respectively corresponding to the twelfth image feature information $I_{12}$ and the thirteenth image feature information $I_{13}$, whose correlation with the fourth text feature information $T_4$ satisfies a predetermined criterion, as the fourth video clip matched to the fourth step.

When a recipe video is generated by using the cooking video and the cooking recipe together as in an embodiment of the disclosure, instead of using a method of compressively summarizing the captured cooking video, the recipe video providing device may include only scenes corresponding to the actual cooking process in the recipe video. A recipe video may be generated so that actions that are not included in the cooking recipe, such as, throwing away food waste from the countertop, are not included in the recipe video. Furthermore, when multiple dishes simultaneously being cooked are captured together within frames constituting the cooking video, the recipe video providing device may exclude a cooking process of other dishes that are not included in the cooking recipe from the cooking video. For example, when there is a cooking recipe for spaghetti, the recipe video providing device may generate a recipe video so that a scene of salad preparation or a scene of bread baking that was also captured are not included in the recipe video for spaghetti. In addition, when even a short section of video in the cooking video is matched to a step included in the cooking recipe, the recipe video providing device may generate a recipe video so that the short section of video is not omitted.

Referring back to FIG. 3, in operation S340, the recipe video providing device generates a recipe video by using at least one frame of a video clip matched to each step of the cooking recipe. The recipe video is a video created by selecting parts of the cooking video that correspond to each step of the cooking recipe. The recipe video may not simply be a summary of the cooking video, but may be a video provided in a time-lapse format by editing only the parts relevant to the cooking recipe. In the process of generating the recipe video using frames selected from the cooking video, frames may be added or deleted according to a user input, and editing such as cropping or enlarging some images within the frames may also be performed.

According to an embodiment of the disclosure, the recipe video providing device may generate the recipe video by using video clips matched to the respective steps of the cooking recipe. For example, when a recipe video having a playback time within a certain amount of time are to be generated even by adding together all the video clips matched to the respective steps of the cooking recipe, or when the video clips consist of frames that change a lot over time, the recipe video providing device may generate the recipe video composed of the video clips matched to the respective steps.

According to an embodiment of the disclosure, the recipe video providing device may generate the recipe video by reducing the number of frames in the video clip matched to each step of the cooking recipe. For example, when a recipe video having a playback time that exceeds a certain amount of time is to be generated by adding all the video clips matched to the respective steps, or when the video clips consist of frames that change slightly over time, the recipe video providing device may generate the recipe video composed of some frames of the video clips matched to the respective steps.

Hereinafter, recipe video generation using video clips matched to respective steps of a cooking recipe is described in detail with reference to FIGS. 9 and 10.

Figure 9:
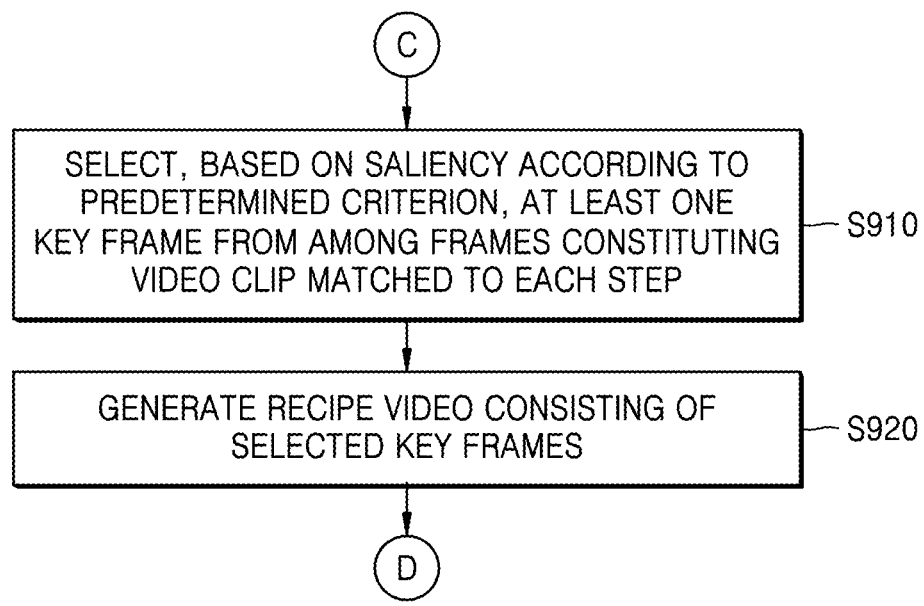
FIG. 9 is a flowchart of a method of providing a recipe video, according to an embodiment of the disclosure.

FIG. 9 is a detailed flowchart illustrating an operation of generating a recipe video by using at least one frame of a video clip matched to each step in a cooking recipe, according to an embodiment of the disclosure.

In operation S910, the recipe video providing device may select, based on saliency according to a predetermined criterion, at least one key frame from among frames constituting a video clip matched to each step of the cooking recipe. Saliency according to a predetermined criterion may be temporal saliency analyzed through saliency of each frame, similarity between frames, or degree of change between frames. The recipe video providing device may use a saliency estimation model that takes frames of a video clip as input and outputs saliency according to a predetermined criterion. By using the saliency estimation model, the recipe video providing device may select at least one key frame from among the frames constituting the video clip matched to each step of the cooking recipe.

The recipe video providing device may divide, based on similarity, frames constituting a video clip matched to each step into clusters. Frames that constitute a video clip matched to each step may have a high similarity therebetween because the frames are highly related to a specific step of the cooking recipe. However, even when frames constituting a specific video clip are matched to the specific step, similarity between non-adjacent frames may be low. The recipe video providing device may cluster the frames constituting the video clip according to a predetermined criterion to thereby divide the video clip into a plurality of sub-sections.

The recipe video providing device may determine, based on saliency estimated using a saliency estimation model, at least one key frame that satisfies a predetermined condition for each cluster of frames. The saliency estimation model may estimate the saliency of each frame based on main elements of an image in the frame. As a kind of video evaluation model, the saliency estimation model may be used to determine whether to select a frame as a key frame, based on whether the frame has good image quality, whether the frame well represents a cooking action corresponding to a step in the cooking recipe, whether the frame reflects the degree of cooking progress, etc. The saliency estimation model may estimate saliency based on at least one of a result of scoring an image quality, a result of scoring a degree to which a main action is performed, or a result of scoring a degree of cooking progress, or a weighted sum of the results. By doing so, the recipe video providing device may remove frames that have deteriorated due to steam, smoke, etc. and exclude frames that do not well reflect cooking actions corresponding to steps of the cooking recipe.

In operation S920, the recipe video providing device may generate a recipe video consisting of the selected key frame. The selected key frame may include an image that is representative of a cooking process corresponding to each step of the cooking recipe.

Figure 10:
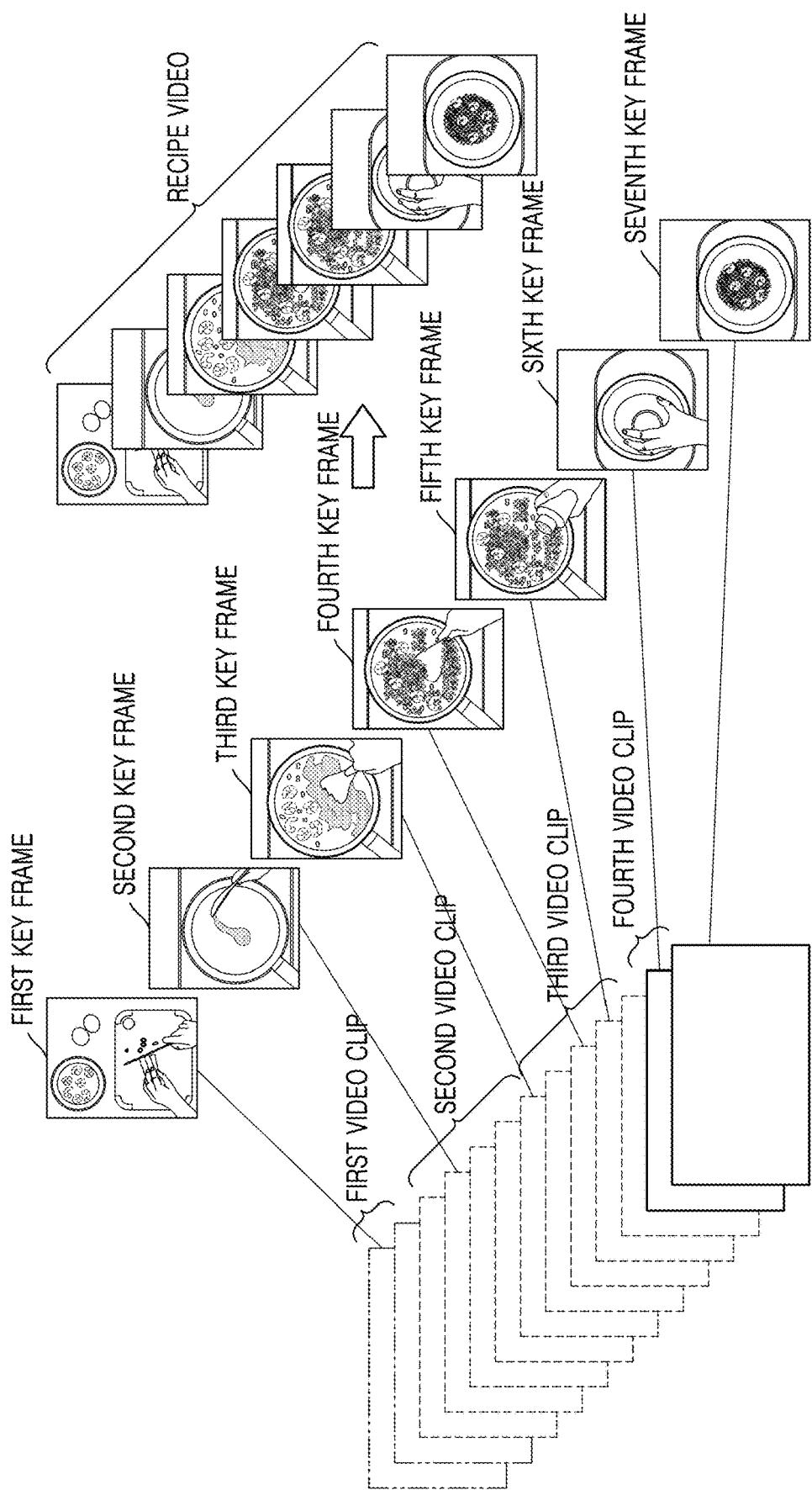
FIG. 10 is a diagram illustrating a recipe video composed of key frames selected from among frames constituting a video clip matched to each step.

FIG. 10 is a diagram illustrating a recipe video composed of key frames selected from among frames constituting a video clip matched to each step.

Referring to FIG. 10 in conjunction with the examples previously described with reference to FIGS. 7 and 8, the recipe video providing device may process the first video clip composed of the first frame and the second frame by matching the first video clip to the first step related to preparing the food ingredients. The recipe video providing device may cluster, based on similarity, the frames constituting the first video clip, i.e., the first frame and the second frame, into a first group. The recipe video providing device may determine the first frame in the first group as the first key frame based on saliency estimated using a saliency estimation model.

The recipe video providing device may process the second video clip consisting of the third to seventh frames by matching the second video clip to the second step related to the cooking process of stir-frying the prepared food ingredients. The recipe video providing device may cluster, based on similarity, the frames constituting the second video clip into a second group including the third frame and the fourth frame and a third group including the fifth frame, the sixth frame, and the seventh frame. The recipe video providing device may determine the fourth frame in the second group as the second key frame, and the sixth frame in the third group as the third key frame, based on the saliency estimated using the saliency estimation model.

The recipe video providing device may process the third video clip consisting of the eighth to eleventh frames by matching the third video clip to the third step related to the cooking process of adding more rice to the stir-fried food ingredients, frying them, and seasoning them. The recipe video providing device may cluster, based on similarity, the frames constituting the third video clip into a fourth group including the eighth frame and the ninth frame and a fifth group including the tenth frame and the eleventh frame. The recipe video providing device may determine the ninth frame in the fourth group as the fourth key frame, and the tenth frame in the fifth group as the fifth key frame, based on the saliency estimated using the saliency estimation model.

The recipe video providing device may process the fourth video clip consisting of the twelfth frame and the thirteenth frame by matching the fourth video clip to the fourth step related to the process of plating the cooked fried rice on tableware. The recipe video providing device may cluster, based on similarity, the frames constituting the fourth video clip into a sixth group including the twelfth frame and a seventh group including the thirteenth frame. The recipe video providing device may determine the twelfth frame in the sixth group as the sixth key frame, and the thirteenth frame in the seventh group as the seventh key frame, based on the saliency estimated using the saliency estimation model.

The recipe video providing device may generate a recipe video composed of frames selected as the first to seventh key frames.

Figure 11:
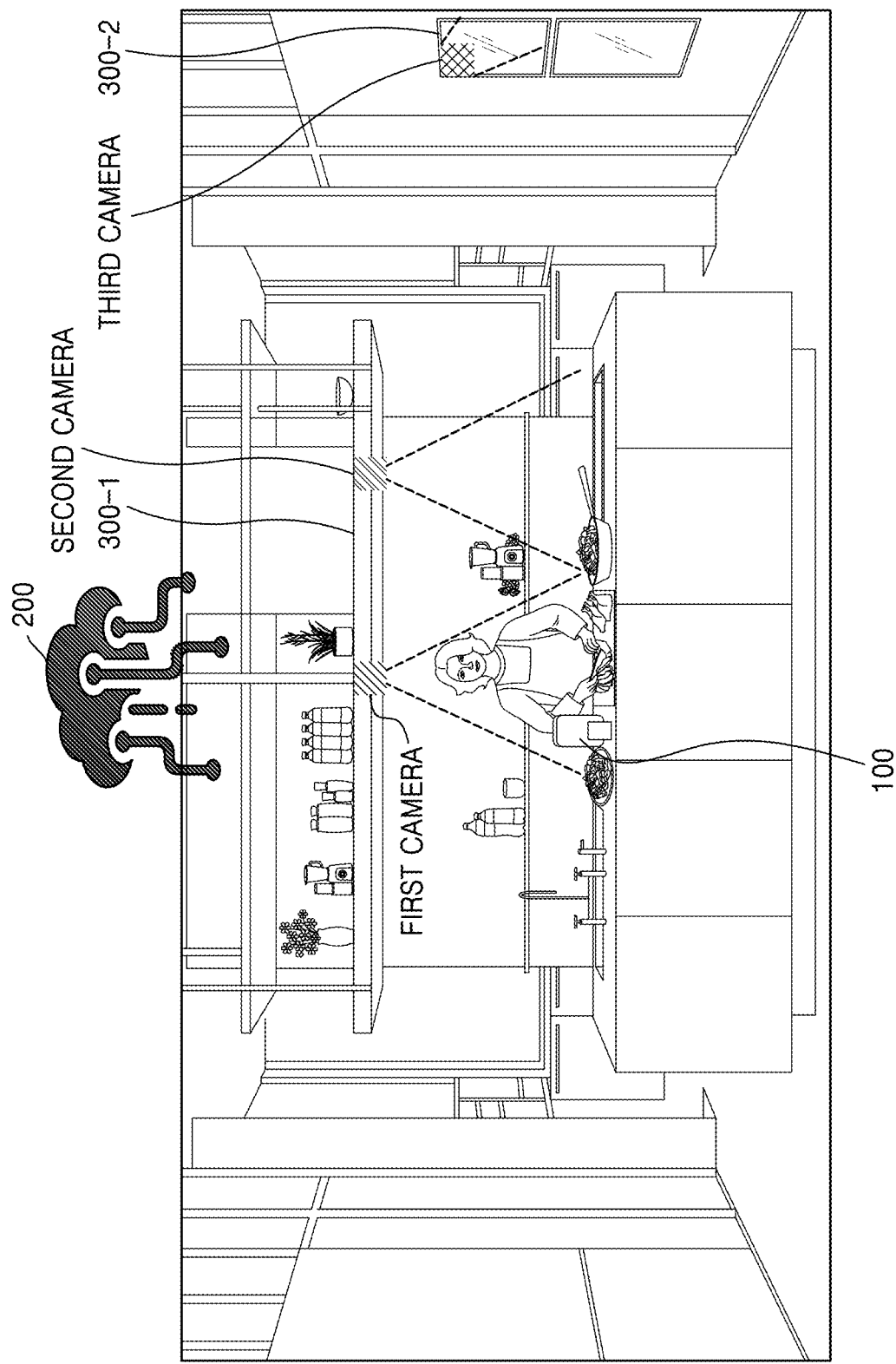
FIG. 11 is a diagram illustrating a process in which a device for providing a recipe video obtains a plurality of cooking videos, according to an embodiment of the disclosure.

FIG. 11 is a diagram illustrating a process in which the recipe video providing device obtains a plurality of cooking videos, according to an embodiment of the disclosure.

Referring to FIG. 11, a first camera and a second camera are installed on the kitchen equipment 300 with the hood 300-1 installed. The first camera and the second camera may capture the user cooking at a countertop. The first camera may generate a first video captured by focusing on a top surface of the countertop where food ingredients may be prepared as a cooking video. The second camera may generate a second video captured by focusing on a cooktop installed in a built-in form at the countertop as a cooking video. A third camera is installed in an oven 300-2. The third camera is installed in the oven 300-2 and may generate a third video captured by focusing on food being cooked within the oven 300-2 as a cooking video. For example, when a dish is cooked using a plurality of pieces of kitchen equipment 300, the recipe video providing device may generate a recipe video of all the entire cooking process by using cooking videos captured by cameras respectively installed in the plurality of pieces of kitchen equipment 300.

The recipe video providing device may obtain videos of cooking actions or cooking process for making food from the pieces of kitchen equipment 300 where the first to third cameras are installed. The process of FIG. 11 is different from the process of obtaining a cooking video as described with reference to FIG. 2 in that the recipe video providing device obtains a plurality of cooking videos. However, as shown in FIG. 11, the plurality of cooking videos may not only be videos captured by the plurality of cameras, but may also be videos captured by a single camera at different times.

Figure 12:
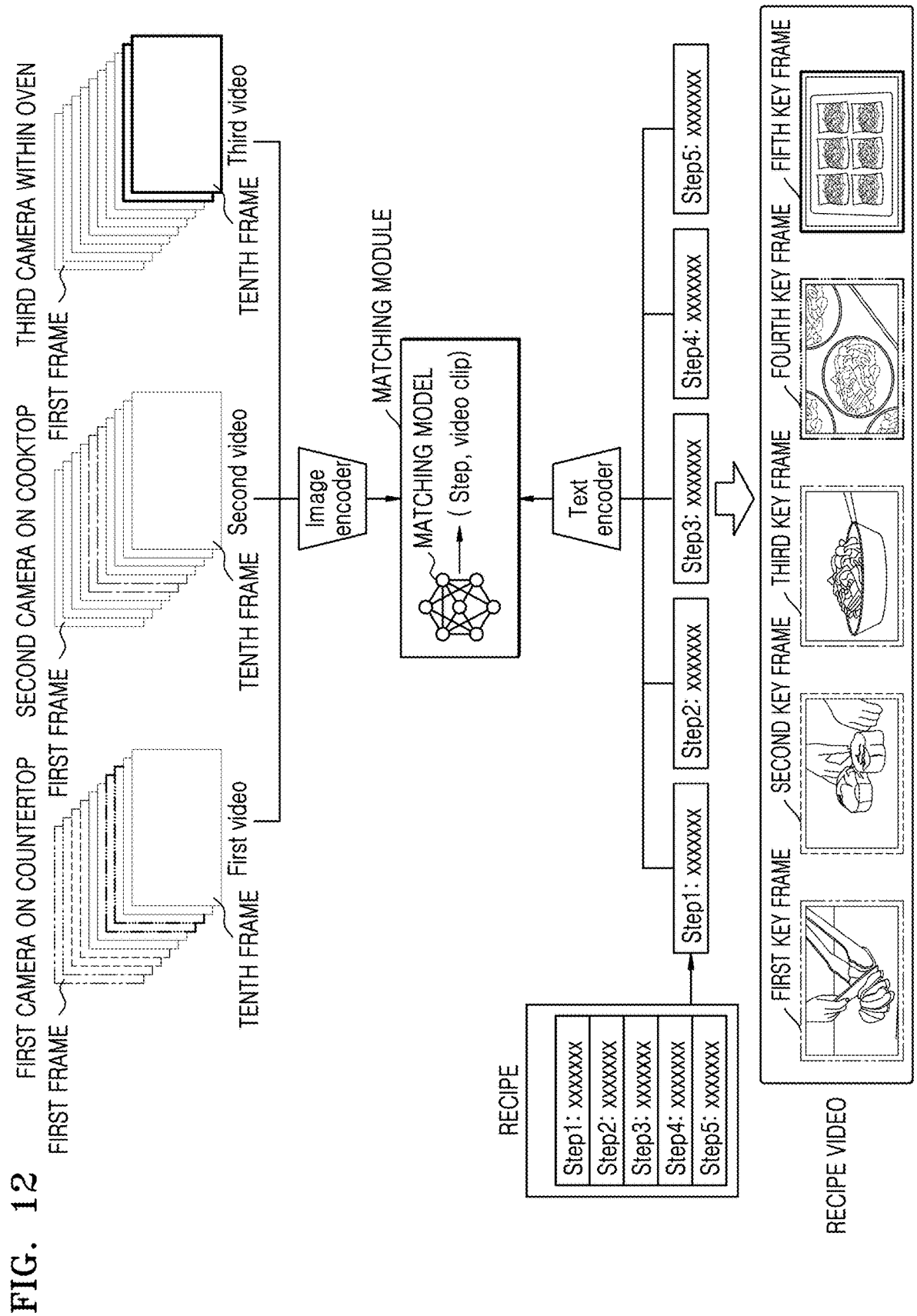
FIG. 12 is a diagram illustrating a process of generating a recipe video corresponding to a cooking recipe from a plurality of cooking videos, according to an embodiment of the disclosure.

FIG. 12 is a diagram illustrating a process of generating a recipe video corresponding to a cooking recipe from a plurality of cooking videos, according to an embodiment of the disclosure.

Referring to FIG. 12, a cooking recipe may include a first step, a second step, a third step, a fourth step, and a fifth step. The recipe video providing device may respectively obtain, via a text encoder, first text feature information, second text feature information, third text feature information, fourth text feature information, and fifth text feature information from texts (or sentences) associated with the steps of the cooking recipe. A plurality of cooking videos may include a first video captured by a first camera on a countertop, a second video captured by a second camera on a cooktop, and a third video captured by a third camera within an oven. In FIG. 12, for convenience of description, the number of frames constituting each cooking video is reduced to ten frames, i.e., first to tenth frames, but is not limited thereto. The recipe video providing device may obtain, via an image encoder, first image feature information to tenth image feature information from frames of each cooking video.

According to the embodiment of the disclosure shown in FIG. 12, the recipe video providing device may obtain pieces of image feature information corresponding to some frames and patches according to information about a target of interest among frames corresponding to the plurality of cooking videos. The information about the target of interest may be information about a section of interest and a region of interest for at least one video of interest among the plurality of videos. The information about the target of interest may be information about to which video among the plurality of videos and which section of the video the target of interest corresponds and information about which region of the video the target of interest corresponds to. By using the information about the target of interest, feature information may be extracted from a predetermined region in a video clip corresponding to a section of a specific video among the plurality of videos. As shown in FIG. 12, the recipe video providing device may respectively extract first image feature information to tenth image feature information from patches corresponding to regions of interest in first to fourth frames of the first video, fifth and sixth frames of the second video, seventh and eighth frames of the first video, and ninth and tenth frames of the third video.

The recipe video providing device may identify, via a matching module, the first frame and the second frame of the first video respectively corresponding to the first image feature information and the second image feature information whose correlation with the first text feature information satisfies a predetermined criterion. The recipe video providing device may match a first video clip including the first frame and the second frame of the first video to the first step corresponding to the first text feature information. The recipe video providing device may identify, via the matching module, the third frame and the fourth frame of the first video respectively corresponding to the third image feature information and the fourth image feature information whose correlation with the second text feature information satisfies a predetermined criterion. The recipe video providing device may match a second video clip including the third frame and the fourth frame of the first video to the second step corresponding to the second text feature information. The recipe video providing device may identify, via the matching module, the fifth frame and the sixth frame of the second video respectively corresponding to the fifth image feature information and the sixth image feature information whose correlation with the third text feature information satisfies a predetermined criterion. The recipe video providing device may match a third video clip including the fifth frame and the sixth frame of the second video to the third step corresponding to the third text feature information. The recipe video providing device may identify, via the matching module, the seventh frame and the eighth frame of the first video respectively corresponding to the seventh image feature information and the eighth image feature information whose correlation with the fourth text feature information satisfies a predetermined criterion. The recipe video providing device may match a fourth video clip including the seventh frame and the eighth frame of the first video to the fourth step corresponding to the fourth text feature information. The recipe video providing device may identify, via the matching module, the ninth frame and the tenth frame of the third video respectively corresponding to the ninth image feature information and the tenth image feature information whose correlation with the fifth text feature information satisfies a predetermined criterion. The recipe video providing device may match a fifth video clip including the ninth frame and the tenth frame of the third video to the fifth step corresponding to the fifth text feature information. In this way, the recipe video providing device may match, via the matching module, a video clip composed of frames having image feature information whose correlation satisfies a predetermined criterion to a corresponding step of the cooking recipe.

The recipe video providing device may process the first video clip composed of the first frame and the second frame of the first video by matching the first video clip to the first step related to preparing a first food ingredient. The recipe video providing device may determine the first frame of the first video as a first key frame based on saliency estimated using a saliency estimation model. The recipe video providing device may process the second video clip composed of the third frame and the fourth frame of the first video by matching the second video clip to the second step related to preparing a second food ingredient. The recipe video providing device may determine the third frame of the first video as a second key frame based on saliency estimated using the saliency estimation model. The recipe video providing device may process the third video clip composed of the fifth frame and the sixth frame by matching the third video clip to the third step related to a cooking process of stir-frying the prepared food ingredients. The recipe video providing device may determine the fifth frame of the second video as a third key frame based on saliency estimated using the saliency estimation model. The recipe video providing device may process the fourth video clip composed of the seventh frame and the eighth frame by matching the fourth video clip to the fourth step related to a cooking process of wrapping the stir-fried food ingredients in dumpling skins. The recipe video providing device may determine the seventh frame of the first video as a fourth key frame based on saliency estimated using the saliency estimation model. The recipe video providing device may process the fifth video clip composed of the ninth frame and the tenth frame by matching the fifth video clip to the fifth step related to a cooking process of baking the prepared dumplings in an oven. The recipe video providing device may determine the ninth frame of the third video as a fifth key frame based on saliency estimated using the saliency estimation model. The recipe video providing device may generate a recipe video composed of frames selected as the first to fifth key frames.

The recipe video providing device is an electronic device capable of obtaining information about a cooking recipe and a cooking video and processing the video by using an AI model, and may be the user terminal 100 or the server 200 but is not limited thereto. Hereinafter, the configuration and operation when the recipe video providing device is the user terminal 100 or the server 200 are described with reference to FIGS. 13, 14, and 15.

Figure 13:
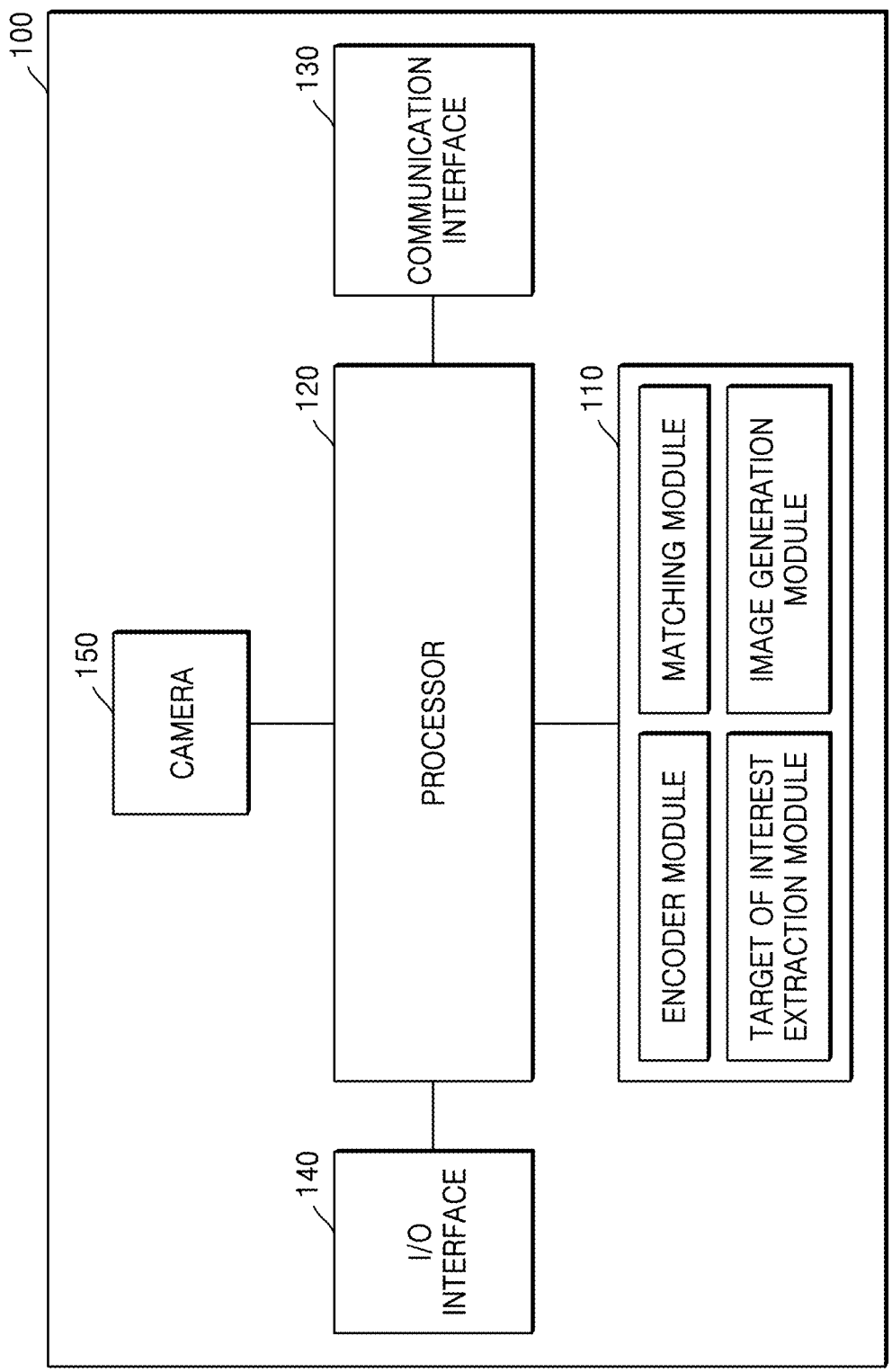
FIG. 13 is a block diagram of a configuration of a user terminal according to an embodiment of the disclosure.

FIG. 13 is a block diagram of a configuration of the user terminal 100 according to an embodiment of the disclosure.

Referring to FIG. 13, according to an embodiment of the disclosure, the user terminal 100 may include a memory 110, a processor 120, a communication interface 130, an input/output (I/O) interface 140, and a camera 150.

The memory 110 may store instructions, data structures, and program code readable by the processor 120. In an embodiment of the disclosure, operations performed by the processor 120 may be implemented by executing instructions or code of a program stored in the memory 110.

According to an embodiment of the disclosure, the memory 1100 may include a flash memory-type memory, a hard disk-type memory, a multimedia card micro-type memory, and a card-type memory (e.g., a Secure Digital (SD) card or an extreme Digital (XD) memory), and include non-volatile memories including at least one of read-only memory (ROM), electrically erasable programmable ROM (EEPROM), PROM, magnetic memory, magnetic disc, or optical disc, and volatile memories, such as random access memory (RAM) or static RAM (SRAM).

According to an embodiment of the disclosure, the memory 110 may store one or more instructions and/or programs for controlling the user terminal 100 to process a video. For example, the memory 110 may store an encoder module, a target of interest extraction module, a matching module, and an image generation module. When training of an AI model is required within the user terminal 100, a model training module may be further installed.

The processor 120 may execute instructions or programmed software modules stored in the memory 110 to control operations or functions performed by the user terminal 100. The processor 120 may consist of hardware components for performing arithmetic, logic and I/O operations and signal processing. The processor 120 may execute one or more instructions stored in the memory 110 to control all operations of the user terminal 100 for generating a recipe video.

For example, according to an embodiment of the disclosure, the processor 1200 may consist of, but is not limited to, at least one of a CPU, a microprocessor, a GPU, application specific integrated circuits (ASICs), DSPs, digital signal processing devices (DSPDs), programmable logic devices (PLDs), field programmable gate arrays (FPGAs), an AP, an NPU, or a dedicated AI processor designed with a hardware structure specialized for processing an AI model. Each processor constituting the processor 120 may be a dedicated processor for performing a predetermined function.

The communication interface 130 may perform wired or wireless communication with other devices or networks. The communication interface 130 may include a communication circuit or communication module that supports at least one of various wired and wireless communication methods. For example, the communication interface 2100 may perform data communication between the user terminal 100 and other devices by using at least one of data communication methods including wired local area network (LAN), wireless LAN, Wi-Fi, Bluetooth, ZigBee, Wi-Fi Direct (WFD), Infrared Data Association (IrDA), Bluetooth Low Energy (BLE), near field communication ((NFC), wireless broadband Internet (WiBro), World Interoperability for Microwave Access (WiMAX), Shared Wireless Access Protocol (SWAP), Wireless Gigabit Alliance (WiGig), and radio frequency (RF) communication.

According to an embodiment of the disclosure, the communication interface 130 may receive, from an external device, an AI model or cooking video used to generate a recipe video. For example, the communication interface 130 may receive, from the server 200, a database or an AI model trained on the server 200. The communication interface 130 may receive a cooking video from the kitchen equipment 300. The communication interface 130 may transmit a recipe video generated by the user terminal 100 to an external device for sharing with other users or for display on the kitchen equipment 300 associated with the recipe video.

According to an embodiment of the disclosure, the communication interface 130 may transmit, to the server 200, information about a cooking video or cooking recipe obtained from the user terminal 100, and receive a recipe video from the server 200. For example, the communication interface 130 may transmit, to the server 200, a cooking video captured by the user terminal 100 or a cooking video received from the kitchen equipment 300. The communication interface 130 may transmit to the server 200 information about a cooking recipe input via the I/O interface 140 of the user terminal 100. The communication interface 130 may receive, from the server 200, a recipe video generated by the server 200.

The I/O interface 140 may include an output interface for providing information or videos, and may further include an input interface for receiving an input. The output interface may include a display panel and a controller for controlling the display panel, and may be implemented in various forms, such as an organic light-emitting diode (OLED) display, an active-matrix OLED (AM-OLED) display, a liquid crystal display (LCD), etc. The input interface may receive various forms of input from the user and include at least one of a touch panel, a keypad, or a pen recognition panel. The I/O interface 140 may be provided in the form of a touch screen that combines a display panel with a touch panel, and may be implemented to be flexible or foldable.

According to an embodiment of the disclosure, the I/O interface 140 may obtain information about a cooking recipe from the user. The I/O interface 140 may receive a user input for information or control commands needed in the process of generating a recipe video.

The camera 150 is a hardware module that captures a video. The camera 150 may capture cooking videos. The camera 150 may include at least one camera module, and support functions such as depth of field, telephoto, wide angle, ultra-wide angle, etc. depending on the specifications of the user terminal 100. The camera 150 may be excluded from the user terminal 100 unless the user terminal 100 is used to directly capture a cooking video.

Figure 14:
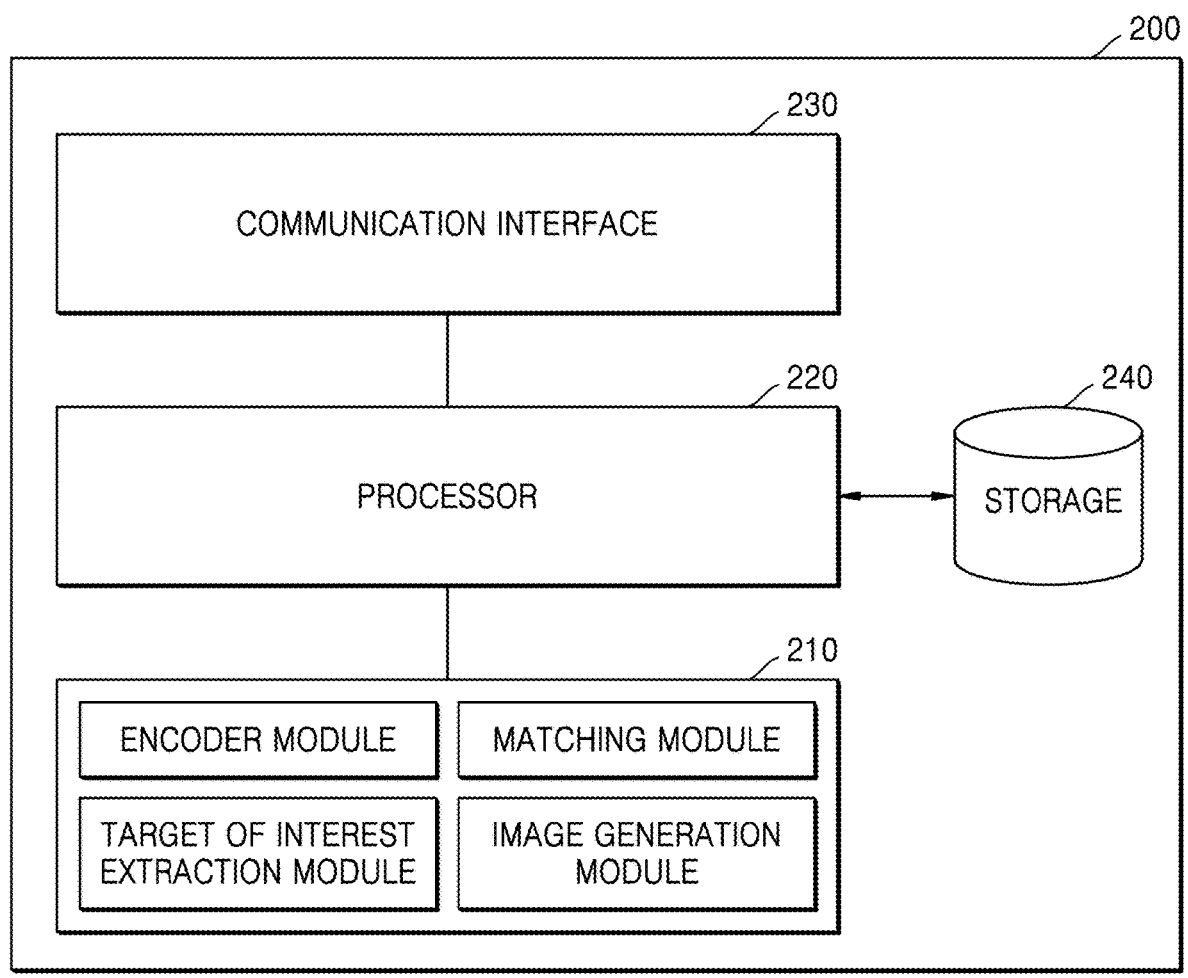
FIG. 14 is a block diagram of a configuration of a server according to an embodiment of the disclosure.

FIG. 14 is a block diagram of a configuration of the server 200 according to an embodiment of the disclosure.

According to an embodiment of the disclosure, the server 200 may include a memory 210, a processor 220, a communication interface 230, and a storage 240. Because the components of the server 200 may respectively correspond to the memory 110, the processor 120, and the communication interface 130 of the user terminal 100 of FIG. 13, descriptions already provided above are omitted herein.

The memory 210 may store various pieces of data, programs, or software modules for driving and controlling the server 200. One or more instructions or software modules stored in the memory 210 may be executed by the processor 220. The memory 210 may store modules that perform the same functions as the modules stored in the memory 110 of the user terminal 100. For example, the memory 210 may store an encoder module, a target of interest extraction module, a matching module, an image generation module, and corresponding data and program instruction code. The processor 220 may control all operations of the server 200. According to an embodiment of the disclosure, the processor 220 may execute one or more instructions stored in the memory 210.

The communication interface 230 may include one or more components that enable communication through a LAN, a wide area network (WAN), a value added network (VAN), a mobile radio communication network, a satellite communication network, or any combination thereof.

The storage 240 may store various AI models. The storage 240 may store training datasets used to train various AI models. The storage 240 may store cooking videos and recipe videos.

According to an embodiment of the disclosure, the server 200 may be a device that has higher computing power than the user terminal 100 so that the server 200 may perform more calculations faster than the user terminal 100. The server 200 may perform training of an AI model, which requires a relatively large amount of computation.

Figure 15:
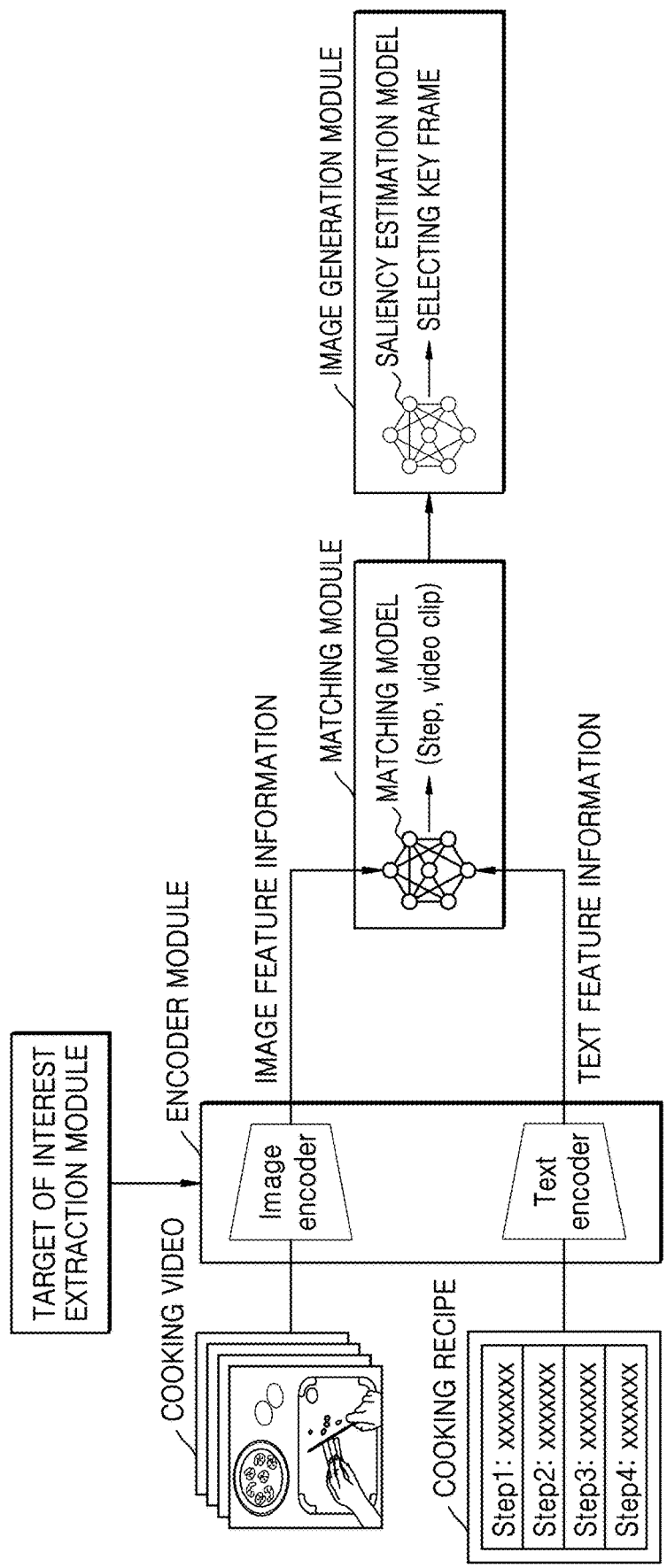
FIG. 15 is a diagram illustrating an operation in which a user terminal or server generates a recipe video.

FIG. 15 is a diagram illustrating an operation in which the user terminal 100 or the server 200 generates a recipe video.

The processor 120 of the user terminal 100 or the processor 220 of the server 200 (hereinafter referred to as the processor 120 or 220) may obtain information about a cooking recipe and a cooking video.

The processor 120 or 220 may obtain, via the encoder module, text feature information corresponding to each step of the cooking recipe and image feature information corresponding to each of the frames constituting the cooking video. The encoder module may include a text encoder for encoding text feature information and an image encoder for encoding image feature information.

The text encoder may perform text embedding for the input test using a text feature encoding model. For example, the text encoder may split the cooking recipe into texts (or sentences) for the respective steps constituting the cooking recipe and extract text feature information from text corresponding to each step. The processor 120 or 220 may obtain, via the text encoder, text feature information corresponding to each step of the cooking recipe from the cooking recipe.

The image encoder may perform image embedding on an input image by using an image feature encoding model. For example, the image encoder may divide the cooking video into frames, and extract image feature information from each of the frames. The processor 120 or 220 may obtain, via the image encoder, image feature information corresponding to each frame in the cooking video from the cooking video.

The processor 120 or 220 may obtain, via the image encoder, image feature information corresponding to a specific section and a specific region in the cooking video according to information about a target of interest. The processor 120 or 220 may prepare in advance information about a target of interest regarding a section of interest and a region of interest from which image feature information is to be extracted via the target of interest extraction module. The target of interest extraction module may use a target of interest extraction model capable of tracking a predetermined action or object in a video. The target of interest extraction model trained for action classification and action range or object classification and object range may provide information about a target of interest regarding a section of interest and a region of interest to the encoder module, such that a region (or bounding box) corresponding to an action or object to be tracked may be extracted as the target of interest from the video.

For example, the processor 120 or 220 may obtain, via the target of interest extraction module, information about a section of interest based on an operational situation of the kitchen equipment 300 and information about a region of interest based on a location of the kitchen equipment 300. The processor 120 or 220 may obtain, via the target of interest extraction module, information about a section of interest and a region of interest based on tracking of a cooking action and the kitchen equipment 300. The processor 120 or 220 may obtain, via the target of interest extraction module, information regarding at least one video of interest among a plurality of cooking videos, and information regarding a section of interest and a region of interest for the at least one video of interest.

The processor 120 or 220 may determine, among the frames constituting the cooking video, a frame corresponding to the section of interest and a patch corresponding to the region of interest according to the information about the target of interest. The processor 120 or 220 may obtain image feature information corresponding to the frame and patch determined according to the information about the target of interest from the cooking video.

The processor 120 or 220 may match, via the matching module, each step of the cooking recipe with a video clip corresponding to a section of the cooking video based on a correlation between the obtained text feature information and the obtained image feature information. The processor 120 or 220 may use a matching model that takes the obtained text feature information and the obtained image feature information as inputs and outputs a correlation of the obtained image feature information to the obtained text feature information. The processor 120 or 220 may match each step of the cooking recipe with the video clip corresponding to the section of the cooking video by using the matching model. The matching model may be trained based on a dataset including text feature information and image feature information. The matching model may calculate a correlation between the obtained text feature information and the obtained image feature information through a matrix multiplication between the obtained text feature information and the obtained image feature information. The processor 120 or 220 may identify, via the matching module, frames having image feature information whose correlation with text feature information corresponding to each step of the cooking recipe satisfies a predetermined criterion. The processor 120 or 220 may match, via the matching module, a video clip composed of frames having image feature information whose correlation satisfies a predetermined criterion to a corresponding step of the cooking recipe. The processor 120 or 220 may perform the task of matching video clips up to the last step of the cooking recipe via the matching module.

The processor 120 or 220 may generate, via the image generation module, a recipe video by using at least one frame of a video clip matched to each step of the cooking recipe. The processor 120 or 220 may use a saliency estimation model that takes as input frames of a video clip matched to each step of the cooking recipe and outputs saliency according to a predetermined criterion. By using the saliency estimation model, the processor 120 or 220 may select at least one key frame from among the frames constituting the video clip matched to each step of the cooking recipe. The processor 120 or 220 may select, via the image generation module, at least one key frame from among the frames constituting the video clip matched to each step based on saliency according to a predetermined criterion. For example, the processor 120 or 220 may divide, based on similarity, the frames constituting the video clip matched to each step, into clusters. The processor 120 or 220 may determine at least one key frame that satisfies a predetermined condition for each cluster of frames, based on saliency estimated according to at least one of a result of scoring an image quality, a result of scoring a degree to which a main action is performed, or a result of scoring a degree of cooking progress, or a weighted sum of the results. The processor 120 or 220 may generate the recipe video consisting of the selected key frame via the image generation module.

Moreover, an embodiment of the disclosure may be implemented in the form of recording media including instructions executable by a computer, such as a program module executable by the computer. The computer-readable recording media may be any available media that are accessible by the computer, and include both volatile and non-volatile media and both removable and non-removable media. Furthermore, the computer-readable recording media may include computer storage media and communication media. The computer storage media include both volatile and non-volatile and both removable and non-removable media implemented in any method or technology for storage of information, such as computer-readable instructions, data structures, program modules, or other data. The communication media may typically include computer-readable instructions, data structures, program modules, or other data in a modulated data signal.

A computer-readable storage medium may be provided in the form of a non-transitory storage medium. In this regard, the term 'non-transitory storage medium' only means that the storage medium does not include a signal (e.g., an electromagnetic wave) and is a tangible device, and the term does not differentiate between where data is semi-permanently stored in the storage medium and where the data is temporarily stored in the storage medium. For example, the 'non-transitory storage medium' may include a buffer for temporarily storing data.

According to an embodiment of the disclosure, methods according to various embodiments of the disclosure set forth herein may be included in a computer program product when provided. The computer program product may be traded, as a product, between a seller and a buyer. The computer program product may be distributed in the form of a machine-readable storage medium (e.g., compact disc ROM (CD-ROM) or distributed (e.g., downloaded or uploaded) on-line via an application store or directly between two user devices (e.g., smartphones). For online distribution, at least a part of the computer program product (e.g., a downloadable app) may be at least transiently stored or temporally generated in a machine-readable storage medium such as a memory of a server of a manufacturer, a server of an application store, or a relay server.

According to an embodiment of the disclosure, a method of providing a recipe video is provided. The method of providing the recipe video may include obtaining text feature information corresponding to each step of a cooking recipe (S310). Furthermore, the method of providing the recipe video may include obtaining image feature information corresponding to each of frames constituting a cooking video (S320). Furthermore, the method of providing the recipe video may include matching, based on a correlation between the obtained text feature information and the obtained image feature information, each step of the cooking recipe with a video clip corresponding to a section of the cooking video (S330). Furthermore, the method of providing the recipe video may include generating the recipe video by using at least one frame of the video clip matched with each step of the cooking recipe (S340).

Furthermore, according to an embodiment of the disclosure, the obtaining of the image feature information (S320) may include obtaining information about a target of interest (S410) regarding a section of interest and a region of interest. Furthermore, the obtaining of the image feature information (S320) may include determining, among the frames constituting the cooking video, a frame corresponding to the section of interest and a patch corresponding to the region of interest according to the information about the target of interest (S420). Furthermore, the obtaining of the image feature information (S320) may include obtaining image feature information corresponding to the determined frame and patch from the cooking video (S430).

Furthermore, the obtaining of the information about the target of interest (S410) may include obtaining information about a section of interest based on an operational situation of kitchen equipment and information about a region of interest based on a location of the kitchen equipment.

Furthermore, the obtaining of the information about the target of interest (S410) may include obtaining information about a section of interest and a region of interest based on tracking of a cooking action and the kitchen equipment.

Furthermore, the obtaining of the information about the target of interest (S410) may include obtaining information about at least one video of interest among a plurality of cooking videos, and information about a section of interest and a region of interest for the at least one video of interest.

Furthermore, according to an embodiment of the disclosure, the generating of the recipe video (S340) may include selecting, based on saliency according to a predetermined criterion, at least one key frame from among frames constituting the video clip matched with each step of the cooking recipe (S910). Furthermore, the generating of the recipe video (S340) may include generating the recipe video consisting of the selected key frame (S920).

Furthermore, the selecting of the at least one key frame (S910) may include dividing, based on similarity, the frames constituting the video clip matched with each step into clusters. Furthermore, the selecting of the at least one key frame (S910) may include determining at least one key frame that satisfies a predetermined condition for each cluster of frames, based on saliency estimated according to at least one of a result of scoring an image quality, a result of scoring a degree to which a main action is performed, or a result of scoring a degree of cooking progress.

Furthermore, according to an embodiment of the disclosure, the matching (S330) may include matching each step of the cooking recipe with the video clip by using a matching model that takes the obtained text feature information and the obtained image feature information as inputs and outputs a correlation of the obtained image feature information to the obtained text feature information.

Furthermore, the matching model may be trained based on a dataset including text feature information and image feature information to calculate the correlation between the obtained text feature information and the obtained image feature information through a matrix multiplication between the obtained text feature information and the obtained image feature information.

According to an embodiment of the disclosure, there is provided a computer-readable recording medium having recorded thereon a program for performing the method of providing the recipe video described above.

According to an embodiment of the disclosure, a device for providing a recipe video is provided. The device for providing the recipe video may include the memory 110 or 210 storing one or more instructions and the processor 120 or 220. The processor 120 or 220 may execute the one or more instructions to obtain text feature information corresponding to each step of a cooking recipe. Furthermore, the processor 120 or 220 may execute the one or more instructions to obtain image feature information corresponding to each of frames constituting a cooking video. Furthermore, the processor 120 or 220 may execute the one or more instructions to match, based on a correlation between the obtained text feature information and the obtained image feature information, each step of the cooking recipe with a video clip corresponding to a section of the cooking video. Furthermore, the processor 120 or 220 may execute the one or more instructions to generate the recipe video by using at least one frame of the video clip matched with each step of the cooking recipe.

Furthermore, according to an embodiment of the disclosure, the processor 120 or 220 may execute the one or more instructions to obtain information about a target of interest regarding a section of interest and a region of interest. Furthermore, the processor 120 or 220 may execute the one or more instructions to determine, among the frames constituting the cooking video, a frame corresponding to the section of interest and a patch corresponding to the region of interest according to the information about the target of interest. Furthermore, the processor 120 or 220 may execute the one or more instructions to obtain image feature information corresponding to the determined frame and patch from the cooking video.

Furthermore, the processor 120 or 220 may execute the one or more instructions to obtain information about a section of interest based on an operational situation of kitchen equipment and information about a region of interest based on a location of the kitchen equipment.

Furthermore, the processor 120 or 220 may execute the one or more instructions to obtain information about a section of interest and a region of interest based on tracking of a cooking action and the kitchen equipment.

Furthermore, the processor 120 or 220 may execute the one or more instructions to obtain information about at least one video of interest among a plurality of cooking videos, and information about a section of interest and a region of interest for the at least one video of interest.

Furthermore, according to an embodiment of the disclosure, the processor 120 or 220 may execute the one or more instructions to select, based on saliency according to a predetermined criterion, at least one key frame from among frames constituting the video clip matched with each step of the cooking recipe, and generate a recipe video consisting of the selected key frame.

Furthermore, the processor 120 or 220 may execute the one or more instructions to divide, based on similarity, the frames constituting the video clip matched with each step into clusters. Furthermore, the processor 120 or 220 may execute the one or more instructions to determine at least one key frame that satisfies a predetermined condition for each cluster of frames, based on saliency estimated according to at least one of a result of scoring an image quality, a result of scoring a degree to which a main action is performed, or a result of scoring a degree of cooking progress.

Furthermore, according to an embodiment of the disclosure, the processor 120 or 220 may execute the one or more instructions to match each step of the cooking recipe with the video clip by using a matching model that takes the obtained text feature information and the obtained image feature information as inputs and outputs a correlation of the obtained image feature information to the obtained text feature information.

Furthermore, the matching model may be trained based on a dataset including text feature information and image feature information to calculate the correlation between the obtained text feature information and the obtained image feature information through a matrix multiplication between the obtained text feature information and the obtained image feature information.

In addition, according to an embodiment of the disclosure, the device for providing the recipe video may further include the communication interface 130 or 230, and the processor 120 or 220 may execute the one or more instructions to receive the cooking video via the communication interface 130 or 230 and transmit the generated recipe video to an external device.

The above description of the disclosure is provided for illustration, and it will be understood by one of ordinary skill in the art that changes in forms or details may be readily made therein without departing from technical idea or essential features of the disclosure. Therefore, it should be understood that the above-described embodiments of the disclosure and all aspects thereof are merely examples and are not limiting. For example, each component defined as an integrated component may be implemented in a distributed fashion, and likewise, components defined as separate components may be implemented in an integrated form.

The scope of the disclosure is defined not by the detailed description thereof but by the following claims, and all the changes or modifications within the meaning and scope of the appended claims and their equivalents should be construed as being included in the scope of the disclosure.

What is claimed is:

1. A method of providing a recipe video, the method comprising:
    obtaining text feature information corresponding to each step of a cooking recipe, the cooking recipe comprising a plurality of steps corresponding to a plurality of coking actions;
    obtaining image feature information corresponding to each frame of a plurality of frames constituting a cooking video;
    matching each step of the cooking recipe with a respective section of the cooking video based on a correlation between the obtained text feature information and the obtained image feature information obtained using a machine learned matching model, wherein the respective section of the cooking video corresponds to a respective step among the plurality of steps; and
    generating the recipe video by using the respective section of the cooking video matched with each step of the cooking recipe.

2. The method of claim 1, wherein
    the obtaining of the image feature information comprises:
    obtaining information about a target of interest comprising a section of interest and a region of interest;
    determining, among the plurality of frames, a frame corresponding to the section of interest and a patch within the frame corresponding to the region of interest according to the information about the target of interest; and
    obtaining the image feature information corresponding to the determined frame and the patch within the frame from the cooking video.

3. The method of claim 2, wherein the obtaining of the information about the target of interest comprises obtaining information about the section of interest based on an operational situation of equipment in a room and information about the region of interest based on a location of the equipment in the room.

4. The method of claim 2, wherein the obtaining of the information about the target of interest comprises obtaining information about the section of interest and obtaining information about the region of interest based on tracking of a cooking action and equipment in a room.

5. The method of claim 2, wherein the obtaining of the information about the target of interest comprises obtaining information about at least one video of interest among a plurality of cooking videos, and obtaining information about the section of interest and the region of interest for the at least one video of interest.

6. The method of claim 1, wherein
    the generating of the recipe video comprises:
    selecting, based on saliency according to a predetermined criterion, at least one key frame from among frames constituting the respective section of the cooking video matched with each step of the cooking recipe; and
    generating the recipe video comprising the selected at least one key frame.

7. The method of claim 6, wherein
    the selecting of the at least one key frame comprises:
    dividing, based on similarity, the frames constituting the respective section of the cooking video matched with each step, into clusters; and
    determining the at least one key frame that satisfies a predetermined condition for each cluster of frames, based on saliency estimated according to at least one of a result of scoring an image quality, a result of scoring a degree to which a main action is performed, or a result of scoring a degree of cooking progress.

8. The method of claim 1, wherein the machine learned matching model receives the obtained text feature information and the obtained image feature information as inputs and outputs the correlation between the obtained image feature information and the obtained text feature information.

9. The method of claim 8, wherein the machine learned matching model is trained based on a dataset including training text feature information and training image feature information to calculate the correlation between the obtained text feature information and the obtained image feature information through a matrix multiplication between the obtained text feature information and the obtained image feature information.

10. A non-transitory computer-readable medium storing instructions that, when executed by at least one processor of a recipe video device, cause the at least one processor to:
obtain text feature information corresponding to each step of a cooking recipe, the cooking recipe comprising a plurality of steps corresponding to a plurality of coking actions;
obtain image feature information corresponding to each frame of a plurality of frames constituting a cooking video;
match each step of the cooking recipe with a respective section of the cooking video based on a correlation between the obtained text feature information and the obtained image feature information obtained using a machine learned matching model, wherein the respective section of the cooking video corresponds to a respective step among the plurality of steps; and
generate the recipe video by using the respective section of the cooking video matched with each step of the cooking recipe.

11. A device for providing a recipe video, the device comprising:
a memory storing one or more instructions; and
a processor configured to execute the one or more instructions to:
obtain text feature information corresponding to each step of a cooking recipe, the cooking recipe comprising a plurality of steps corresponding to a plurality of coking actions,
obtain image feature information corresponding to each frame of a plurality of frames constituting a cooking video,
match each step of the cooking recipe with a respective section of the cooking video based on a correlation between the obtained text feature information and the obtained image feature information obtained using a machine learned matching model, wherein the respective section of the cooking video corresponds to a respective step among the plurality of steps, and
generate the recipe video by using the respective section of the cooking video matched with each step of the cooking recipe.

12. The device of claim 11, wherein the processor is further configured to execute the one or more instructions to:
obtain information about a target of interest comprising a section of interest and a region of interest,
determine, among the plurality of frames, a frame corresponding to the section of interest and a patch within the frame corresponding to the region of interest according to the information about the target of interest, and
obtain the image feature information corresponding to the determined frame and the patch within the frame from the cooking video.

13. The device of claim 12, wherein the processor is further configured to execute the one or more instructions to obtain information about the section of interest based on an operational situation of equipment in a room and information about the region of interest based on a location of the equipment in the room.

14. The device of claim 12, wherein the processor is further configured to execute the one or more instructions to obtain information about the section of interest and obtain information about the region of interest based on tracking of a cooking action and equipment in a room.

15. The device of claim 12, wherein the processor is further configured to execute the one or more instructions to obtain information about at least one video of interest among a plurality of cooking videos, and obtain information about the section of interest and the region of interest for the at least one video of interest.

16. The device of claim 11, wherein the processor is further configured to execute the one or more instructions to:
select, based on saliency according to a predetermined criterion, at least one key frame from among frames constituting the respective section of the cooking video matched with each step of the cooking recipe, and
generate the recipe video comprising the selected at least one key frame.

17. The device of claim 16, wherein the processor is further configured to execute the one or more instructions to:
divide, based on similarity, the frames constituting the respective section of the cooking video matched with each step, into clusters, and
determine the at least one key frame that satisfies a predetermined condition for each cluster of frames, based on saliency estimated according to at least one of a result of scoring an image quality, a result of scoring a degree to which a main action is performed, or a result of scoring a degree of cooking progress.

18. The device of claim 11, wherein the machine learned matching model receives the obtained text feature information and the obtained image feature information as inputs and outputs the correlation between the obtained image feature information and the obtained text feature information.

19. The device of claim 18, wherein the machine learned matching model is trained based on a dataset including training text feature information and training image feature information to calculate the correlation between the obtained text feature information and the obtained image feature information through a matrix multiplication between the obtained text feature information and the obtained image feature information.

20. The device of claim 19, further comprising
a communication interface,
wherein the processor is further configured to execute the one or more instructions to,
via the communication interface, receive the cooking video and transmit the generated recipe video to an external device.

* * * * *